(12) United States Patent
Imade

(10) Patent No.: US 9,525,856 B2
(45) Date of Patent: Dec. 20, 2016

(54) IMAGING DEVICE AND IMAGING METHOD

(71) Applicant: OLYMPUS CORPORATION, Tokyo (JP)

(72) Inventor: Shinichi Imade, Iruma (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 14/963,433

(22) Filed: Dec. 9, 2015

(65) Prior Publication Data

US 2016/0088277 A1 Mar. 24, 2016

Related U.S. Application Data

(63) Continuation of application No. PCT/JP2014/060452, filed on Apr. 11, 2014.

(30) Foreign Application Priority Data

Jun. 26, 2013 (JP) .................. 2013-133918

(51) Int. Cl.
*H04N 9/64* (2006.01)
*G02B 7/34* (2006.01)
(Continued)

(52) U.S. Cl.
CPC ............. *H04N 9/646* (2013.01); *G02B 7/34* (2013.01); *G02B 7/365* (2013.01); *G03B 13/36* (2013.01); *H04N 9/045* (2013.01)

(58) Field of Classification Search
CPC ........ H04N 9/646; H04N 9/045; G02B 7/365; G02B 7/34; G03B 13/36
See application file for complete search history.

(56) References Cited

U.S. PATENT DOCUMENTS

| 4,734,571 A | 3/1988 | Hamada et al. |
| 2007/0236598 A1 | 10/2007 | Kusaka |
| 2011/0017923 A1 | 1/2011 | Kubo et al. |

FOREIGN PATENT DOCUMENTS

| JP | S62-103615 A | 5/1987 |
| JP | 2001-174696 A | 6/2001 |

(Continued)

OTHER PUBLICATIONS

International Search Report dated Jul. 15, 2014 issued in PCT/JP2014/060452.

*Primary Examiner* — Twyler Haskins
*Assistant Examiner* — Angel L Garces-Rivera
(74) *Attorney, Agent, or Firm* — Scully, Scott, Murphy & Presser, P.C.

(57) ABSTRACT

An imaging device includes an optics, an image sensor, and a processor including hardware. The optics includes a first pupil and a second pupil. The image sensor includes a first-color filter that has first transmittance characteristics, a second-color filter that has second transmittance characteristics, and a third-color filter that has third transmittance characteristics. The processor is configured to implement a correction process that corrects a pixel value that corresponds to a first color and a pixel value that corresponds to a third color based on a component value that corresponds to the overlapping region of the first transmittance characteristics and the third transmittance characteristics, and a phase difference detection process that detects the phase difference between an image formed by the corrected pixel value that corresponds to the first color and an image formed by the corrected pixel value that corresponds to the third color.

12 Claims, 14 Drawing Sheets

(51) Int. Cl.
*G03B 13/36* (2006.01)
*H04N 9/04* (2006.01)
*G02B 7/36* (2006.01)

(56) References Cited

FOREIGN PATENT DOCUMENTS

| | | |
|---|---|---|
| JP | 2007-282108 A | 10/2007 |
| JP | 2009-122524 A | 6/2009 |
| JP | 4585050 B1 | 11/2010 |
| JP | 2012-220790 A | 11/2012 |
| JP | 2012-252280 A | 12/2012 |
| JP | 2013-044806 A | 3/2013 |
| JP | 2013-057761 A | 3/2013 |

IMAGING DEVICE AND IMAGING METHOD

CROSS REFERENCE TO RELATED APPLICATION

This application is a continuation of International Patent Application No. PCT/JP2014/060452, having an international filing date of Apr. 11, 2014, which designated the United States, the entirety of which is incorporated herein by reference. Japanese Patent Application No. 2013-133918 filed on Jun. 26, 2013 is also incorporated herein by reference in its entirety.

BACKGROUND

The present invention relates to an imaging device, an imaging method, and the like.

An image sensor that includes RGB color filters has been widely used for an imaging device. The amount of light that passes through the color filter increases (i.e., sensitivity increases) as the band of the color filter becomes wider. Therefore, a normal image sensor is designed so that the transmittance characteristics of the RGB color filters overlap each other.

A phase difference detection process that utilizes parallax from two pupils has been used when implementing a phase detection AF process or the like. For example, JP-A-2001-174696 discloses a method that captures RGB images in a state in which the right pupil allows R and G to pass through, and the left pupil allows G and B to pass through, and detects the phase difference between the R image and the B image that produce parallax.

SUMMARY

According to one aspect of the invention, there is provided an imaging device comprising:
an optics that includes a first pupil that allows light within a first wavelength band to pass through, and a second pupil that allows light within a second wavelength band to pass through, the second wavelength band differing from the first wavelength band;
an image sensor that includes a first-color filter that has first transmittance characteristics, a second-color filter that has second transmittance characteristics, and a third-color filter that has third transmittance characteristics, and acquires a pixel value that corresponds to a first color, a pixel value that corresponds to a second color, and a pixel value that corresponds to a third color; and
a processor comprising hardware,
the processor being configured to implement:
a correction process that corrects the pixel value that corresponds to the first color and the pixel value that corresponds to the third color based on a component value that corresponds to an overlapping region of the first transmittance characteristics and the third transmittance characteristics; and
a phase difference detection process that detects a phase difference between an image formed by the corrected pixel value that corresponds to the first color and an image formed by the corrected pixel value that corresponds to the third color.

According to another aspect of the invention, there is provided an imaging method comprising:
forming an image using an optics that includes a first pupil that allows light within a first wavelength band to pass through, and a second pupil that allows light within a second wavelength band to pass through, the second wavelength band differing from the first wavelength band;
capturing the image using an image sensor that includes a first-color filter that has first transmittance characteristics, a second-color filter that has second transmittance characteristics, and a third-color filter that has third transmittance characteristics;
correcting a pixel value that corresponds to a first color and a pixel value that corresponds to a third color among the pixel value that corresponds to the first color, a pixel value that corresponds to a second color, and the pixel value that corresponds to the third color that have been acquired by the capturing based on a component value that corresponds to an overlapping region of the first transmittance characteristics and the third transmittance characteristics; and
detecting a phase difference between an image formed by the corrected pixel value that corresponds to the first color and an image formed by the corrected pixel value that corresponds to the third color.

DESCRIPTION OF EXEMPLARY EMBODIMENTS

Figure 1:
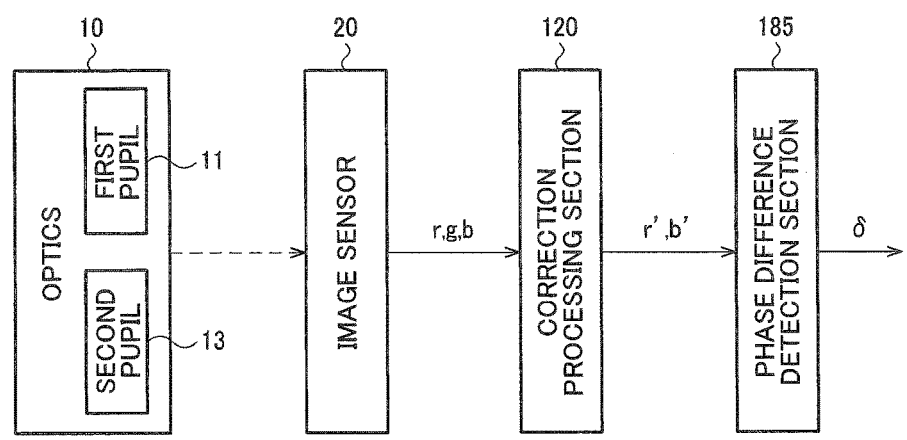
FIG. 1 illustrates a basic configuration example of an imaging device.

Several embodiments of the invention may provide an imaging device, an imaging method, and the like that can accurately detect the phase difference from an image captured using color filters for which the transmittance characteristics overlap each other.

According to one embodiment of the invention, there is provided an imaging device comprising:
an optics that includes a first pupil that allows light within a first wavelength band to pass through, and a second pupil that allows light within a second wavelength band to pass through, the second wavelength band differing from the first wavelength band;
an image sensor that includes a first-color filter that has first transmittance characteristics, a second-color filter that has second transmittance characteristics, and a third-color filter that has third transmittance characteristics, and acquires a pixel value that corresponds to a first color, a pixel value that corresponds to a second color, and a pixel value that corresponds to a third color;

a processor comprising hardware, the processor being configured to implement:

a correction process that corrects the pixel value that corresponds to the first color and the pixel value that corresponds to the third color based on a component value that corresponds to an overlapping region of the first transmittance characteristics and the third transmittance characteristics; and a phase difference detection process that detects a phase difference between an image formed by the corrected pixel value that corresponds to the first color and an image formed by the corrected pixel value that corresponds to the third color.

According to another embodiment of the invention, there is provided an imaging method comprising:

forming an image using an optics that includes a first pupil that allows light within a first wavelength band to pass through, and a second pupil that allows light within a second wavelength band to pass through, the second wavelength band differing from the first wavelength band;

capturing the image using an image sensor that includes a first-color filter that has first transmittance characteristics, a second-color filter that has second transmittance characteristics, and a third-color filter that has third transmittance characteristics;

correcting a pixel value that corresponds to a first color and a pixel value that corresponds to a third color among the pixel value that corresponds to the first color, a pixel value that corresponds to a second color, and the pixel value that corresponds to the third color that have been acquired by the capturing based on a component value that corresponds to an overlapping region of the first transmittance characteristics and the third transmittance characteristics; and detecting a phase difference between an image formed by the corrected pixel value that corresponds to the first color and an image formed by the corrected pixel value that corresponds to the third color.

According to these embodiments of the invention, the pixel value that corresponds to the first color and the pixel value that corresponds to the third color are corrected based on the component value that corresponds to the overlapping region of the first transmittance characteristics and the third transmittance characteristics, and the phase difference between the image formed by the corrected pixel value that corresponds to the first color and the image formed by the corrected pixel value that corresponds to the third color is detected. This makes it possible to accurately detect the phase difference from an image captured using color filters for which the transmittance characteristics overlap each other.

Exemplary embodiments of the invention are described in detail below. Note that the following exemplary embodiments do not in any way limit the scope of the invention defined by the claims laid out herein. Note also that all of the elements described below in connection with the exemplary embodiments should not necessarily be taken as essential elements of the invention.

1. Outline

An outline of several embodiments of the invention is described below. Although an example that utilizes an image sensor that includes an RGB Bayer color filter array is described below, the embodiments of the invention are not limited thereto. It suffices that the image sensor include color filters that overlap each other with respect to the wavelength band. Although an example in which the first pupil is the right pupil and the second pupil is the left pupil is described below, the configuration is not limited thereto.

Figure 8:
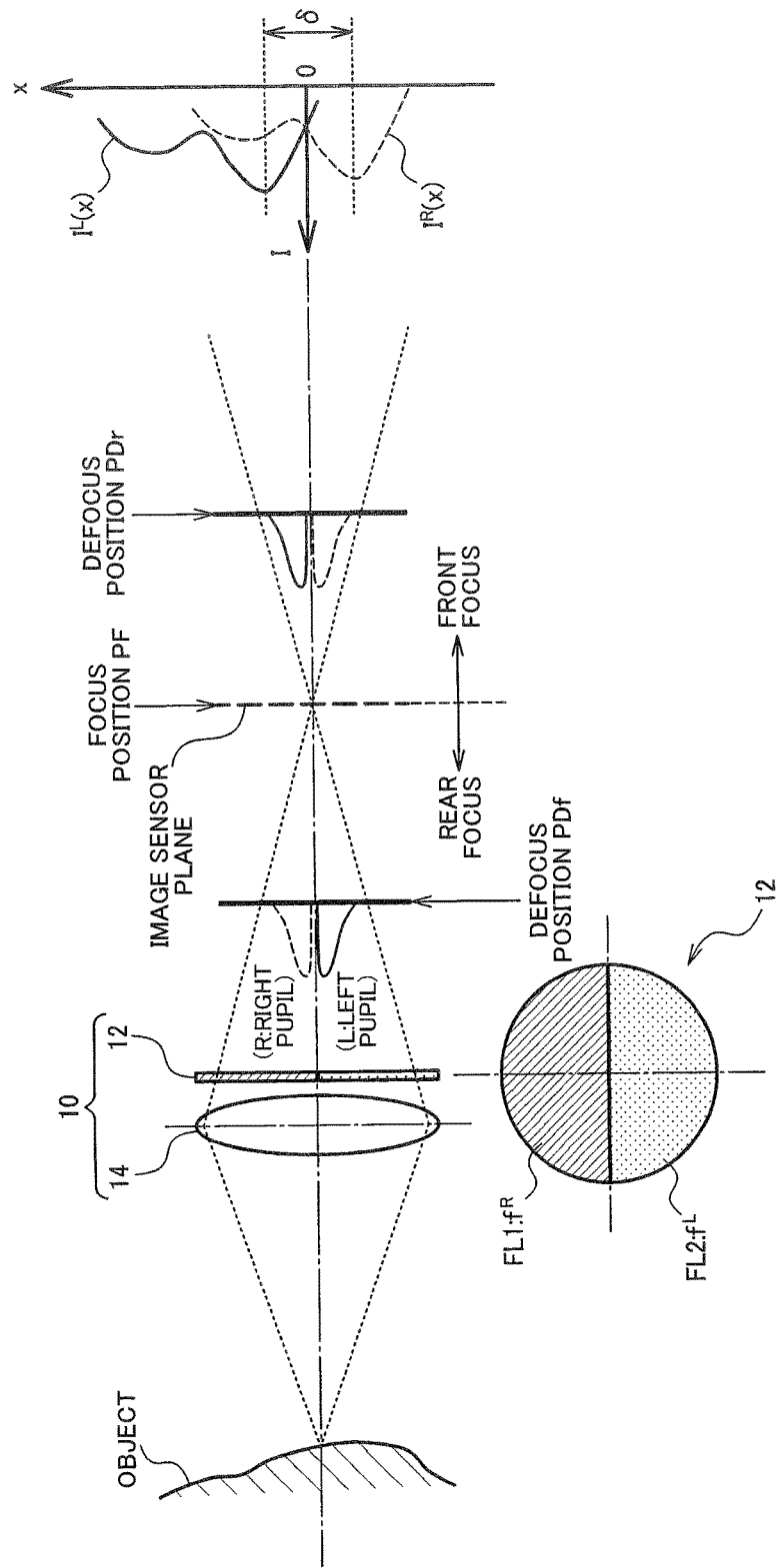
FIG. 8 illustrates a basic configuration example of an imaging device (third embodiment).
Figure 9:
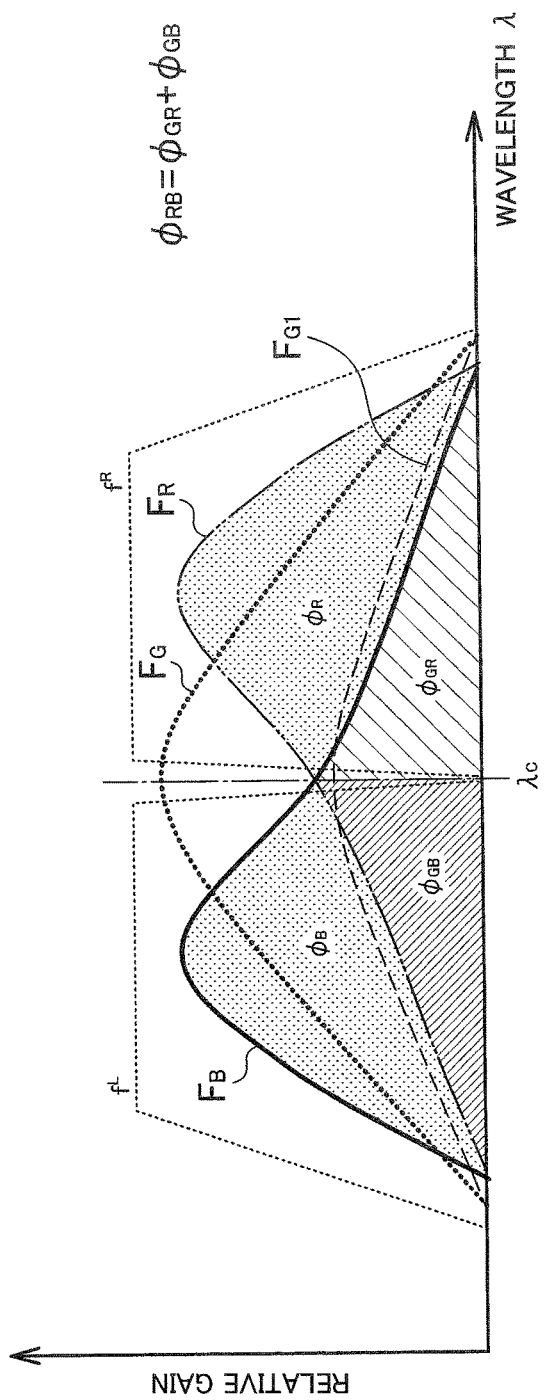
FIG. 9 is a view illustrating a method that separates an image into a right-pupil image and a left-pupil image.

FIG. 8 illustrates a basic configuration example of an imaging device. An optics 10 of the imaging device includes an optical filter 12 that divides the pupil. The optical filter 12 includes an optical filter FL1 that corresponds to the right pupil, and an optical filter FL2 that corresponds to the left pupil. FIG. 9 schematically illustrates the transmittance characteristics of the optical filter 12 and the transmittance characteristics of color filters of an image sensor. The optical filter FL1 (right pupil) and the optical filter FL2 (left pupil) included in the optical filter 12 respectively have transmittance characteristics $f^R$ and transmittance characteristics $f^L$, the color filters (RGB color filters) of the image sensor respectively have transmittance characteristics $F_B$, transmittance characteristics $F_G$, and transmittance characteristics $F_R$. In this case, a phase-difference image is obtained by forming the right-pupil image using a red pixel value $r=I \cdot F_R$, and forming the left-pupil image using a blue pixel value $b=I \cdot F_B$. Note that I is the intensity of light incident on each pixel of the image sensor.

However, since the transmittance characteristics $F_B$ and the transmittance characteristics $F_R$ of the color filters overlap each other in the region $\phi_{RB}=\phi_{GB}+\phi_{GR}$, a decrease in red color purity and blue color purity occurs. The right-pupil image and the left-pupil image include a mixed component due to a decrease in color purity. Specifically, the right-pupil image is represented by $r=I \cdot F_R=I \cdot (\phi_R+\phi_{GR}+\phi_{GB})$, and the component $I \cdot \phi_{GB}$ is a component that has passed through the left pupil. The left-pupil image is represented by $b=I \cdot F_B=I \cdot (\phi_B+\phi_{GB}+\phi_{GR})$, and the component $I \cdot \phi_{GR}$ is a component that has passed through the right pupil. The degree of separation between the right-pupil image and the left-pupil image decreases due to these components, and the phase difference detection accuracy deteriorates.

As illustrated in FIG. 1, the imaging device according to one embodiment of the invention includes the optics 10, an image sensor 20, a correction processing section 120, and a phase difference detection section 185. The optics 10 includes a first pupil 11 that allows light within a first wavelength band $f^R$ to pass through, and a second pupil 13 that allows light within a second wavelength band $f^L$ to pass through, the second wavelength band $f^L$ differing from the first wavelength band $f^R$. The image sensor 20 includes a first-color (blue) filter that has first transmittance characteristics $F_B$, a second-color (green) filter that has second transmittance characteristics $F_G$, and a third-color (red) filter that has third transmittance characteristics $F_R$, and acquires a pixel value b that corresponds to a first color, a pixel value g that corresponds to a second color, and a pixel value r that corresponds to a third color. The correction processing section 120 corrects the pixel value b that corresponds to the first color and the pixel value r that corresponds to the third color based on a component value that corresponds to the overlapping region $\phi_{RB}=\phi_{GB}+\phi_{GR}$ of the first transmittance characteristics $F_B$ and the third transmittance characteristics $F_R$. The phase difference detection section 185 detects the phase difference between an image (left-pupil image) formed by the corrected pixel value $b'=I \cdot \phi_B$ that corresponds to the first color and an image (right-pupil image) formed by the corrected pixel value $r'=I \cdot \phi_R$ that corresponds to the third color.

This makes it possible to implement a correction process that reduces (or cancels) the overlapping component $(I \cdot \phi_{RB})$ of the pixel value b that corresponds to the first color and the pixel value r that corresponds to the third color. Therefore, it is possible to obtain the right-pupil image (r'=I·$\phi_R$) and the left-pupil image (b'=I·$\phi_B$) in which an undesirable component is mixed to only a small extent (or is not mixed), from the captured image captured using the color filters for which the transmittance characteristics $F_B$, $F_G$, and $F_R$ overlap each other. This makes it possible to implement a highly accurate phase difference detection process.

The above configuration is further described below taking the embodiments described below as an example. A normal image sensor is designed so that the overlapping region $\phi_{RB}$ of the transmittance characteristics $F_B$ and the transmittance characteristics $F_R$ is similar to the green (second color) transmittance characteristics $F_G$, and the component value I·$\phi_{RB}$ that corresponds to the overlapping region $\phi_{RB}$ is estimated based on the green pixel value g. The component value I·$\phi_{RB}$ is subtracted from the pixel values b and r to obtain corrected blue and red pixel values {b', r'}={I·$\phi_B$, I·$\phi_R$}.

Specifically, the pixel value b that corresponds to the first color and the pixel value r that corresponds to the third color are corrected based on the component value I·$\phi_{RB}$ that corresponds to the overlapping region to calculate the corrected pixel values {b', r'}={I·$\phi_B$, I·$\phi_R$}. The corrected pixel values I·$\phi_B$ and I·$\phi_R$ have high color purity since the overlapping region of the transmittance characteristics $F_B$ and $F_R$ of the color filters has been removed. It is possible to improve the accuracy of correlation calculations used for the phase difference detection process by utilizing the pixel values having high color purity.

The imaging device may be configured as described below. Specifically, the imaging device may include the optics 10, the image sensor 20, a memory that stores information (e.g., a program and various types of data), and a processor (i.e., a processor including hardware) that operates based on the information stored in the memory. The optics 10 includes the first pupil 11 that allows light within the first wavelength band fR to pass through, and the second pupil 13 that allows light within the second wavelength band fL to pass through, the second wavelength band fL differing from the first wavelength band fR. The image sensor 20 includes the first-color filter that has the first transmittance characteristics FB, the second-color filter that has the second transmittance characteristics FG, and the third-color filter that has the third transmittance characteristics FR, and acquires the pixel value b that corresponds to the first color, the pixel value g that corresponds to the second color, and the pixel value r that corresponds to the third color. The processor is configured to implement the correction process that corrects the pixel value b that corresponds to the first color and the pixel value r that corresponds to the third color based on the component value that corresponds to the overlapping region $\phi RB$=$\phi GB$+$\phi GR$ of the first transmittance characteristics FB and the third transmittance characteristics FR, and the phase difference detection process that detects the phase difference between an image formed by the corrected pixel value b'=I·$\phi B$ that corresponds to the first color and an image formed by the corrected pixel value r'=I·$\phi R$ that corresponds to the third color.

The processor may implement the function of each section by individual hardware, or may implement the function of each section by integrated hardware, for example. The processor may be a central processing unit (CPU), for example. Note that the processor is not limited to a CPU. Various other processors such as a graphics processing unit (GPU) or a digital signal processor (DSP) may also be used.

The processor may be a hardware circuit that includes an ASIC. The memory may be a semiconductor memory (e.g., SRAM or DRAM), a register, a magnetic storage device (e.g., hard disk drive), or an optical storage device (e.g., optical disk device). For example, the memory stores a computer-readable instruction. Each section of the imaging device (i.e., the image processing device (e.g., the image processing device 100 illustrated in FIG. 6) included in the imaging device) is implemented by causing the processor to execute the instruction. The instruction may be an instruction included in an instruction set that is included in a program, or may be an instruction that causes a hardware circuit included in the processor to operate.

The operation according to the embodiments of the invention is implemented as described below, for example. An image captured by the image sensor 20 is stored in the storage section. The processor reads the image from the storage section, and acquires the pixel value b that corresponds to the first color, the pixel value g that corresponds to the second color, and the pixel value r that corresponds to the third color (of each pixel). Information (coefficient α in the expression (1)) about the overlapping region $\phi_{RB}$ of the first transmittance characteristics $F_B$ and the third transmittance characteristics $F_R$ is stored (e.g., stored in advance) in the storage section. The processor reads the information about the overlapping region $\phi_{RB}$ from the storage section, corrects the pixel value b that corresponds to the first color and the pixel value r that corresponds to the third color from the information about the overlapping region $\phi_{RB}$, the pixel value b that corresponds to the first color, the pixel value g that corresponds to the second color, and the pixel value r that corresponds to the third color, and stores the corrected pixel value b'=I·$\phi_B$ that corresponds to the first color and the corrected pixel value r'=F $\phi_R$ that corresponds to the third color in the storage section. The processor reads an image formed by the pixel value b' and an image formed by the pixel value r' from the storage section, detects the phase difference between the image formed by the pixel value b' and the image formed by the pixel value r', and stores the phase difference in the storage section.

Each section of the imaging device (i.e., the image processing device (e.g., the image processing device 100 illustrated in FIG. 6) included in the imaging device) is implemented as a module of a program that operates on the processor. For example, the correction processing section 120 is implemented as a correction processing module that corrects the pixel value b that corresponds to the first color and the pixel value r that corresponds to the third color based on the component value that corresponds to the overlapping region $\phi_{RB}$=$\phi_{GB}$+$\phi_{GR}$ of the first transmittance characteristics $F_B$ and the third transmittance characteristics $F_R$. Likewise, the phase difference detection section 185 is implemented as a phase difference detection module that detects the phase difference between the image formed by the corrected pixel value b'=I·$\phi_B$ that corresponds to the first color and the image formed by the corrected pixel value r'=I·$\phi_R$ that corresponds to the third color.

2. First Embodiment 2.1. Spectral Separation Method that Achieves High Purity

A first embodiment of the invention is described in detail below. Note that the image sensor 20 is hereinafter appropriately referred to as "image sensor". The transmittance characteristics (spectral characteristics) {$F_B$, $F_G$, $F_R$, $F_{G1}$, $F_{G2}$} and the regions {$\phi_B$, $\phi_G$, $\phi_R$, $\phi_{RB}$} of the transmittance characteristics are functions of the wavelength $\lambda$, but the transmittance characteristics $F_B(\lambda)$ and the like are referred to as the transmittance characteristics $F_B$ and the like for convenience of explanation. The values {$I\cdot\phi_B$, $I\cdot\phi_G$, $I\cdot\phi_R$, $I\cdot\phi_{RB}$} obtained by multiplying the values {$\phi_B$, $\phi_G$, $\phi_R$, $\phi_{RB}$} by the light intensity I (followed by integration using the wavelength $\lambda$) are pixel values or component values.

Figure 2:
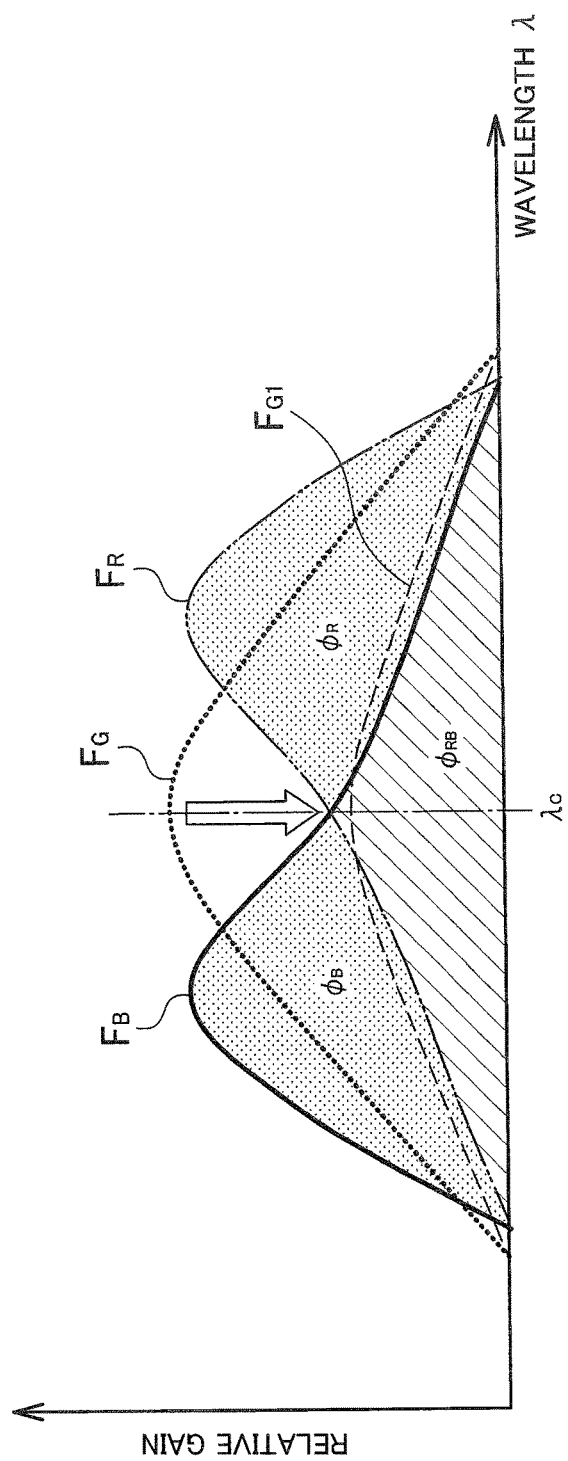
FIG. 2 is a view illustrating a method that calculates a high-color-reproduction image.
Figure 3:
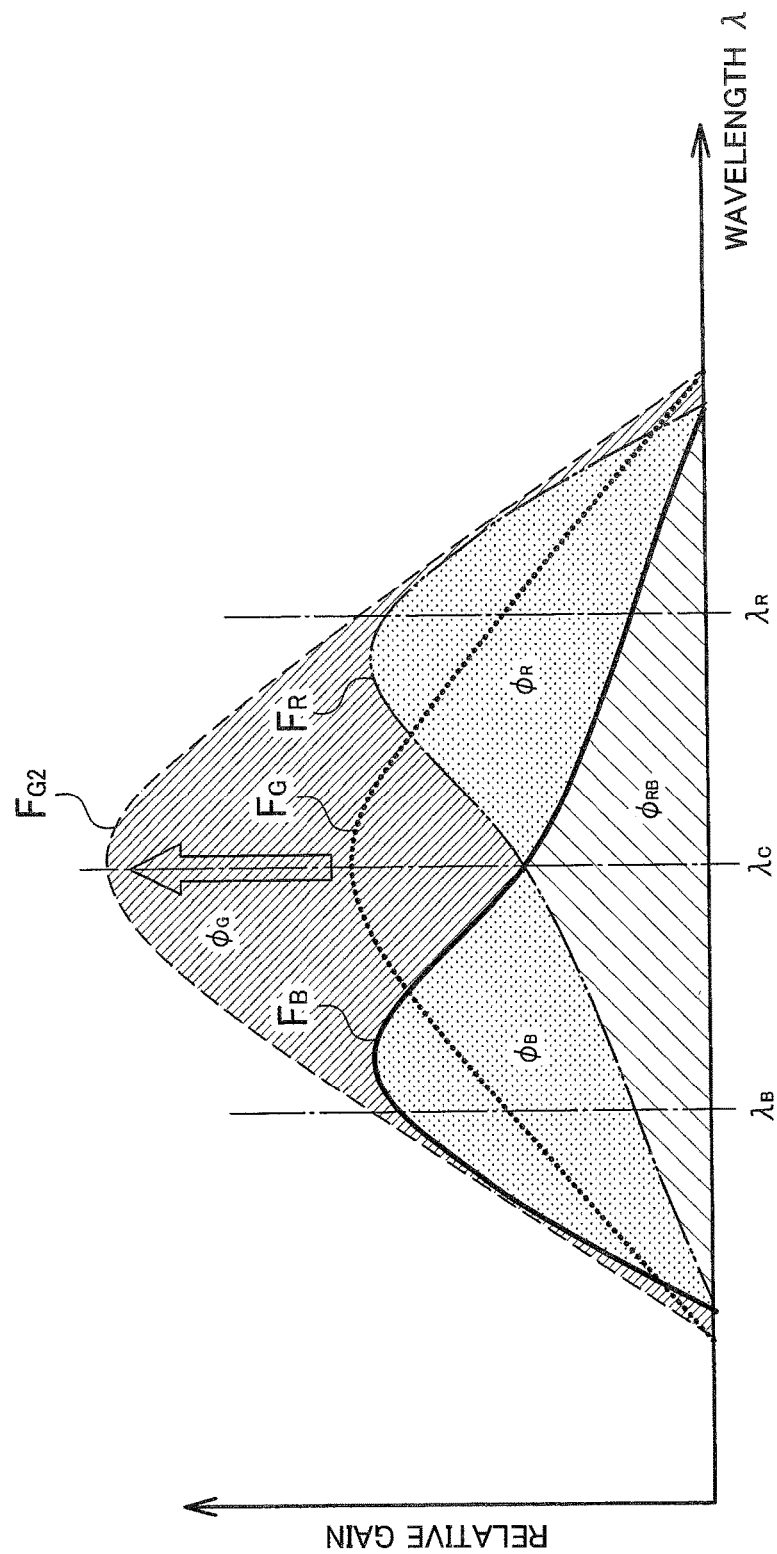
FIG. 3 is a view illustrating a method that calculates a high-color-reproduction image.

A method that acquires a high-color-reproduction image from an RGB captured image captured without dividing the pupil is described below. As illustrated in FIGS. 2 and 3, the transmittance characteristics $F_B$, $F_G$, and $F_R$ of the color filters of the image sensor are divided into four regions $\phi_R$, $\phi_{RB}$, $\phi_B$, and $\phi_G$. The region $\phi_{RB}$ is a region in which the transmittance characteristics $F_B$ and $F_R$ overlap each other. The region $\phi_R$ is a region obtained by removing the region $\phi_{RB}$ (overlapping region) from the transmittance characteristics $F_R$. The region $\phi_B$ is a region obtained by removing the region $\phi_{RB}$ (overlapping region) from the transmittance characteristics $F_B$. The region $\phi_G$ is a region obtained by removing the regions $\phi_R$, $\phi_{RB}$, and $\phi_B$ from the characteristics $F_{G2}$ obtained by increasing the gain of the transmittance characteristics $F_G$ so as to include the transmittance characteristics $F_B$ and $F_R$.

When the regions $\phi_R$, $\phi_B$, and $\phi_G$ are considered to be a light intensity component of light that has passed through filters having high-purity primary-color (RGB) spectral characteristics, a high-color-reproduction image can be obtained if the characteristics of the regions $\phi_R$, $\phi_B$, and $\phi_G$ can be calculated in advance.

A method that extracts red and blue high-purity pixel values {r', b'}={$I\cdot\phi_R$, $I\cdot\phi_B$} is described below with reference to FIG. 2. A color image sensor that is widely used is characterized in that the spectral characteristics $F_{RG}$ of the overlapping region $\phi_{RB}$ and the spectral characteristics $F_G$ of the green color filter have high similarity. Therefore, the region $\phi_{RB}$ can be approximated using the following expression (1). Note that the coefficient $\alpha$ is calculated as described later.

$$\phi_{RB} \approx F_{G1} = \alpha \cdot F_G,$$

$$0 < \alpha < 1.0 \qquad (1)$$

The regions $\phi_R$ and $\phi_B$ are calculated from the region $\phi_{RB}$ calculated using the expression (1). As illustrated in FIG. 2, the following expression (2) is satisfied.

$$F_R = \phi_R + \phi_{RB},$$

$$F_B = \phi_B + \phi_{RB} \qquad (2)$$

Since the following expression (3) is satisfied in view of the expressions (1) and (2), the regions $\phi_R$ and $\phi_B$ can be calculated.

$$\phi_R = F_R - \phi_{RB} \approx F_R - \alpha \cdot F_G,$$

$$\phi_B = F_B - \phi_{RB} \approx F_B - \alpha \cdot F_G \qquad (3)$$

When the intensity of light incident on each pixel of the image sensor is referred to as I, the values represented by the following expression (4) are obtained as the RGB pixel values of each pixel.

$$r = I \cdot F_R,$$

$$g = I \cdot F_G,$$

$$b = I \cdot F_B \qquad (4)$$

Specifically, the high-purity pixel values r' and b' are calculated using the following expression (5) in view of the expressions (3) and (4).

$$r' = I \cdot \phi_R \approx r - \alpha \cdot g,$$

$$b' = I \cdot \phi_b \approx b - \alpha \cdot g \qquad (5)$$

A method that extracts a green high-purity pixel value $g'(=I\cdot\phi_G)$ is described below with reference to FIG. 3. The spectral characteristics $F_{G2}$ are obtained by multiplying the green spectral characteristics $F_G$ by a gain $\beta$ (coefficient $\beta$). The gain $\beta$ is calculated so that the spectral characteristics $F_{G2}$ include the regions $\phi_R$ and $\phi_B$ and the gain becomes a minimum. Note that the gain $\beta$ is calculated as described in detail later.

The gain of the green spectral characteristics $F_G$ is increased using the gain $\beta$ to obtain the spectral characteristics $F_{G2}$ (see the following expression (6)).

$$F_{G2} = \beta \cdot F_G,$$

$$1.0 < \beta \qquad (6)$$

The region $\phi_G$ is calculated by the following expression (7) from the spectral characteristics $F_{G2}$ calculated using the expression (6) and the regions $\phi_R$, $\phi_{RB}$, and $\phi_B$ calculated using the expressions (1) and (3).

$$\phi_G = \beta \cdot F_G - (\phi_R + \phi_{RB} + \phi_B) \qquad (7)$$

The high-purity pixel value g' is calculated using the following expression (8) in view of the expressions (1), (4), and (7).

$$g' = I \cdot \phi_G = \beta \cdot g - (r + \alpha \cdot g + b) \qquad (8)$$

The high-purity primary-color pixel values {r', g', b'}={$I\cdot\phi_B$, $I\cdot\phi_G$, $I\cdot\phi_R$} are thus obtained.

Note that an image acquired by an image sensor designed so that the RGB characteristics overlap each other to a certain extent can be used directly as the high-sensitivity image. Therefore, the pixel values r, g, and b can be used for the high-sensitivity image.

2.2. Coefficient ($\alpha$, $\beta$) Calculation Method

The coefficients $\alpha$ and $\beta$ are calculated (estimated) as described below. The coefficients $\alpha$ and $\beta$ calculated as described below may be stored in the image processing device 100, or the image processing device 100 may acquire the spectral characteristics $F_B$, $F_G$, and $F_R$, and calculate the coefficients $\alpha$ and $\beta$ based on the spectral characteristics $F_B$, $F_G$, and $F_R$.

Figure 4:
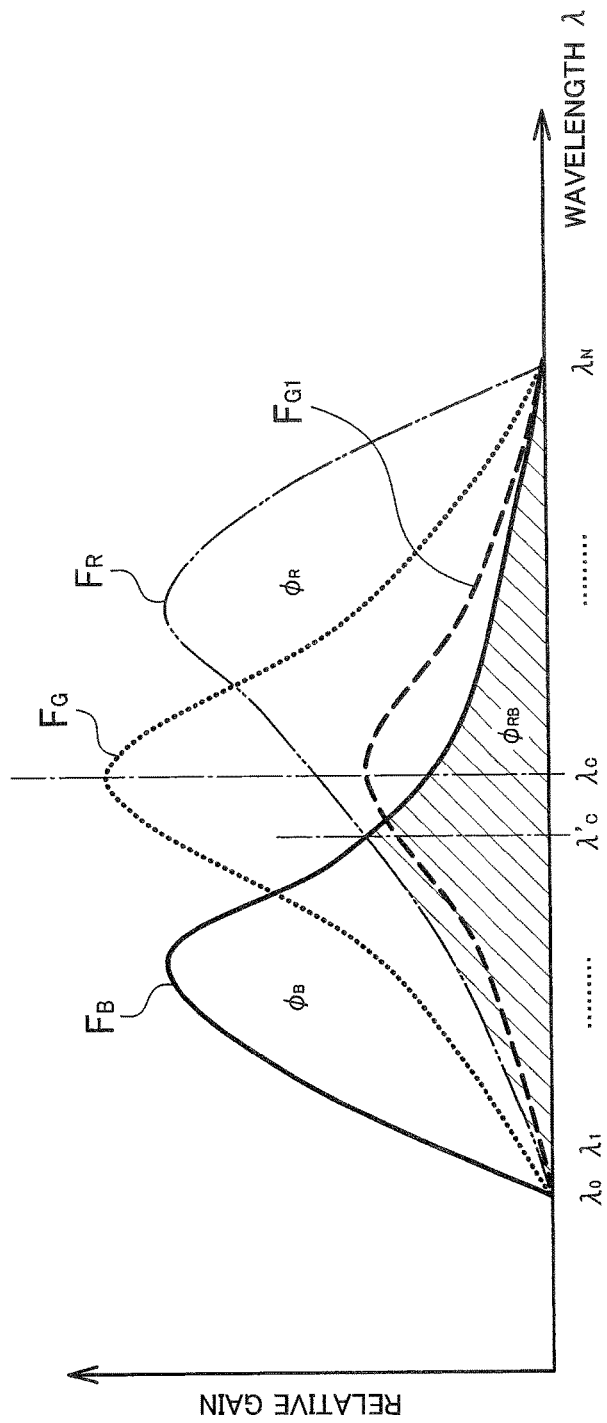
FIG. 4 is a view illustrating a method that calculates a coefficient $\alpha$.

As illustrated in FIG. 4, the spectral characteristics $F_B$ and $F_R$ are not necessarily symmetrical with respect to the spectral characteristics $F_G$. The coefficients $\alpha$ and 13 are determined as described below when the spectral characteristics $F_B$ and $F_R$ are not symmetrical with respect to the spectral characteristics $F_G$.

The coefficient $\alpha$ is calculated as described below. The overlapping region $\phi_{RB}$ of the spectral characteristics $F_B$ and the spectral characteristics $F_R$ is biased with respect to the spectral characteristics $F_G$. The wavelength that corresponds to the maximum value of the spectral characteristics $F_G$ is referred to as $\lambda_C$, and the wavelength that corresponds to the cross point of the spectral characteristics $F_B$ and the spectral characteristics $F_R$ is referred to as $\lambda'_C$. The spectral characteristics of the overlapping region $\phi_{RB}$ and the spectral characteristics $F_G$ are respectively considered to be a vector $V_{RB}$ and a vector $V_G$ that include transmittance components that respectively correspond to a wavelength $\lambda_0$, a wavelength $\lambda_1$, a wavelength $\lambda_2$, ..., and a wavelength $\lambda_N$ (see the following expression (9)).

$$V_{RB}=[\phi_{RB}(\lambda_0),\phi_{RB}(\lambda_1),\phi_{RB}(\lambda_2),\ldots,\phi_{RB}(\lambda_N)],$$

$$V_G=[F_G(\lambda_0),F_G(\lambda_1),F_G(\lambda_2),\ldots,F_G(\lambda_N)] \quad (9)$$

The coefficient $\alpha$ that minimizes the Euclidean distance between the vector $V_{RB}$ and the vector $V_G$ is used (see the following expression (10)). This makes it possible to improve the similarity between the overlapping region $\phi_{RB}$ and the spectral characteristics $\alpha F_G$ (=$F_{G1}$), and optimize the effect of reducing a leakage light component.

$$\alpha=\min\{\sqrt{(V_{RB}-\alpha V_G)^2}\} \quad (10)$$

Note that the coefficient $\alpha$ may be calculated using another method. For example, the regions $\phi_R$ and $\phi_B$ may be calculated using the expressions (1) and (3) while changing the coefficient $\alpha$ as a variable, the pixel values r' and b' may be calculated using the expression (5) on the assumption that the light intensity I is the intensity of white light having flat spectral characteristics, and the coefficient $\alpha$ may be calculated (searched) so that the white balance is optimized.

Figure 5:
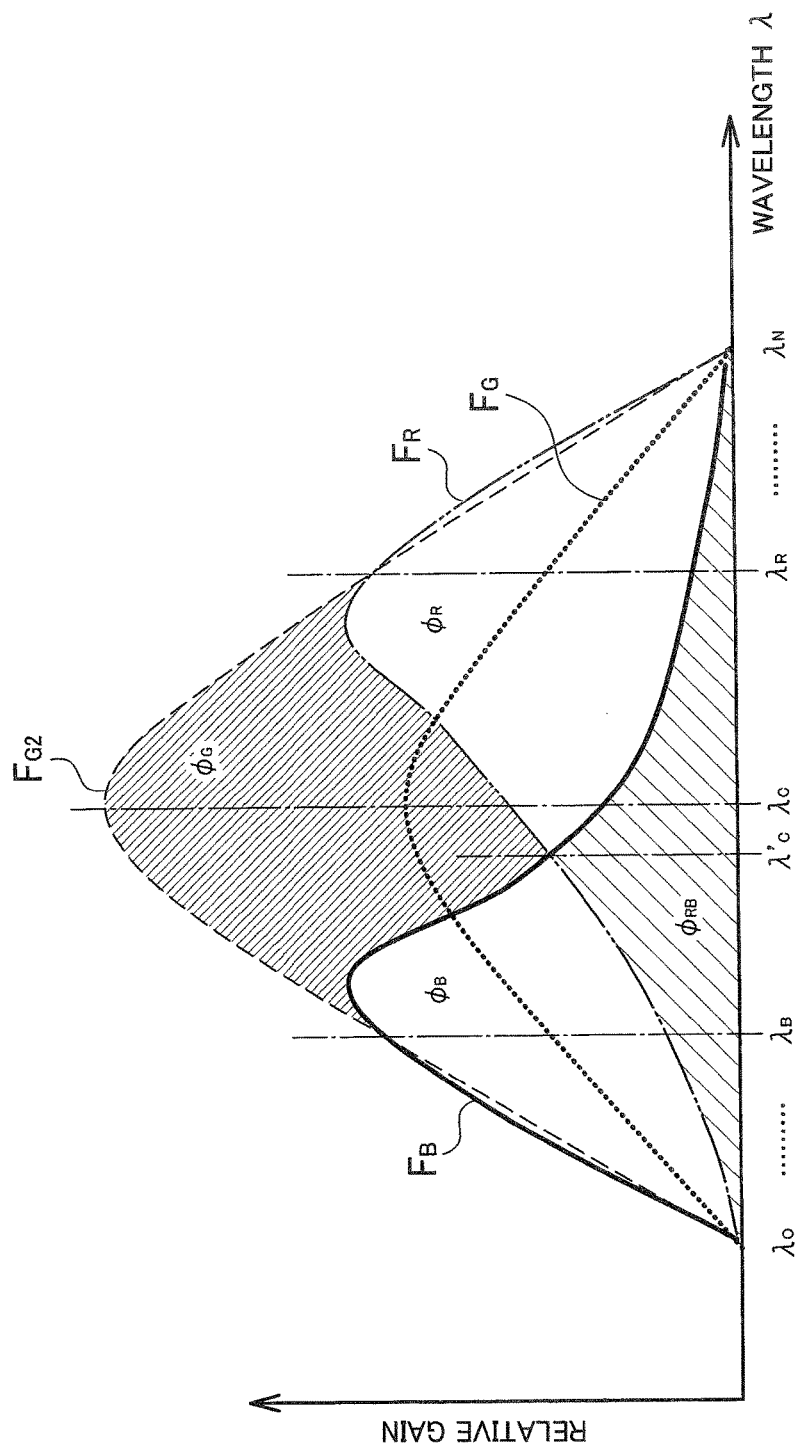
FIG. 5 is a view illustrating a method that calculates a coefficient $\beta$.

The coefficient $\beta$ is calculated as described below. As illustrated in FIG. 5, a region obtained by subtracting the regions $\phi_R$, $\phi_{RB}$, and $\phi_B$ from the spectral characteristics $F_{G2}$ obtained by increasing the gain of the spectral characteristics $F_G$ so as to include regions $\phi_R$ and $\phi_B$ is referred to as a region $\phi_G$. The wavelength band within which the spectral characteristics $F_R$ and the spectral characteristics $F_{G2}$ almost coincide with each other includes a wavelength $\lambda_R, \ldots,$ and a wavelength $\lambda_N$, and the wavelength band within which the spectral characteristics $F_B$ and the spectral characteristics $F_{G2}$ almost coincide with each other includes a wavelength $\lambda_0, \ldots,$ and a wavelength $\lambda_B$. The spectral characteristics $F_R$ and the spectral characteristics $F_{G2}$ are respectively considered to be a vector $V_R$ and a vector $V_{GR2}$ that include transmittance components that respectively correspond to a wavelength $\lambda_R$, a wavelength $\lambda_{R+1}, \ldots,$ and a wavelength $\lambda_N$ (see the following expression (11)). The spectral characteristics $F_B$ and the spectral characteristics $F_{G2}$ are respectively considered to be a vector $V_B$ and a vector $V_{GB2}$ that include transmittance components that respectively correspond to a wavelength $\lambda_0$, a wavelength $\lambda_1, \ldots,$ and a wavelength $\lambda_B$.

$$V_R=[F_R(\lambda_R),F_R(\lambda_{R+1}),\ldots,F_R(\lambda_N)],$$

$$V_{GR2}=[F_{G2}(\lambda_R),F_{G2}(\lambda_{R+1}),\ldots,F_{G2}(\lambda_N)],$$

$$V_B[F_B(\lambda_0),F_B(\lambda_1),\ldots,F_B(\lambda_B)],$$

$$V_{GB2}=[F_{G2}(\lambda_0),F_{G2}(\lambda_1),\ldots,F_{G2}(\lambda_B)] \quad (11)$$

The coefficient $\beta$ that minimizes the Euclidean distance between the vector $V_R$ and the vector $V_{GR2}$ and the Euclidean distance between the vector $V_B$ and the vector $V_{GB2}$ is used (see the following expression (12)). This makes it possible to improve the similarity between the regions $\phi_R$ and $\phi_B$ and the spectral characteristics $\beta F_G$(=$F_{G2}$), and optimize the effect of reducing a leakage light component.

$$\beta=\min\{\sqrt{(V_B-\beta V_{GB2})^2}+\sqrt{V_R-\beta V_{GR2})^2}\} \quad (12)$$

Note that the coefficient $\beta$ may be calculated using another method. For example, the regions $\phi_R$, $\phi_{RB}$, and $\phi_B$ may be calculated using the expressions (1) and (3) while changing the coefficient $\beta$ as a variable, the pixel values r', g', and b' may be calculated using the expression (5) on the assumption that the light intensity I is the intensity of white light having flat spectral characteristics, and the coefficient $\beta$ may be calculated (searched) so that the white balance is optimized.

Although an example in which the spectral characteristics $F_B$, $F_G$, and $F_R$ are the spectral characteristics of the color filters of the image sensor has been described above, the spectral characteristics $F_B$, $F_G$, and $F_R$ may include the spectral characteristics of the imaging optics, the sensitivity characteristics of the pixels of the image sensor, the spectral characteristics of a light source, and the like. In this case, the spectral characteristics $F_B$, $F_G$, and $F_R$ are determined corresponding to illumination and the imaging conditions using the image sensor, and the coefficients $\alpha$ and $\beta$ may be calculated in advance. When an image is captured using external light or the like, the spectral characteristics $F_B$, $F_G$, and $F_R$ may be detected each time an image is captured, and the coefficients $\alpha$ and $\beta$ may be calculated from the detected spectral characteristics.

2.3. Imaging Device

Figure 6:
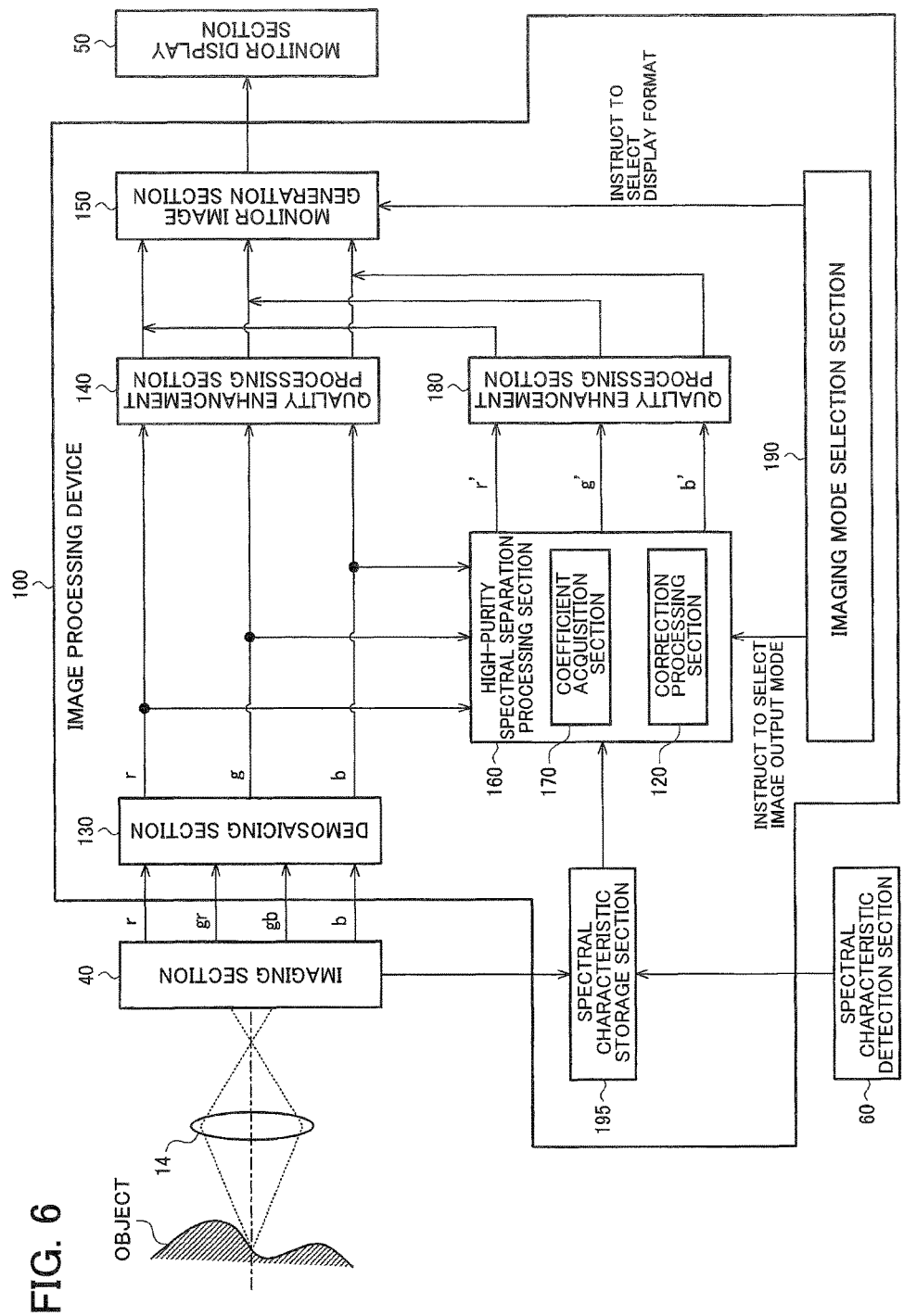
FIG. 6 illustrates a configuration example of an imaging device (first embodiment).

FIG. 6 illustrates a configuration example of an imaging device that simultaneously acquires the high-sensitivity image {r, g, b} and the high-color-reproduction image {r', g', b'}.

The imaging device includes an imaging lens 14 (optics), an imaging section 40, a monitor display section 50, a spectral characteristic detection section 60, and the image processing device 100. The image processing device 100 includes a demosaicing section 130, a quality enhancement processing section 140, a monitor image generation section 150, a high-purity spectral separation processing section 160, a quality enhancement processing section 180, an imaging mode selection section 190, and a spectral characteristic storage section 195.

The imaging section 40 includes the image sensor 20 and an imaging processing section. The image sensor 20 is a color image sensor that includes a Bayer array, for example. The imaging processing section performs an imaging operation control process, an analog pixel signal A/D conversion process, and the like, and outputs a Bayer-array image {r, gr, gb, b}.

The demosaicing section 130 performs a demosaicing process on the Bayer-array image to generate an image (RGB image) {r, g, b} that has RGB pixel values on a pixel basis.

Since the color image sensor is designed so that the RGB characteristics $F_B$, $F_G$, and $F_R$ overlap each other to a certain extent, the image {r, g, b} can be used directly as the high-sensitivity image. Note that an image sensor having normal overlapping characteristics may be used as the color image sensor, or an image sensor having higher overlapping characteristics may be used as the color image sensor. In the latter case, each color band can be widened, and an image can be captured with higher sensitivity. For example, a bright image can be captured in a dark place.

The quality enhancement processing section 140 performs a quality enhancement process (e.g., noise reduction process and grayscale correction process) on the high-sensitivity image {r, g, b}, and outputs the resulting image to the monitor image generation section 150. The monitor image generation section 150 displays the image on the monitor display section 50.

The high-purity spectral separation processing section 160 includes a coefficient acquisition section 170 that acquires the coefficient $\alpha$ and $\beta$, and a correction processing section 120 that extracts high-purity primary-color components from the RGB image {r, g, b} generated by the demosaicing process.

The spectral characteristic storage section 195 stores the spectral characteristics $\{F_B, F_G, F_R\}$ of the color filters. The spectral characteristics may be acquired from the imaging section 40, or may be stored in the spectral characteristic storage section 195 in advance, for example. The spectral characteristic detection section 60 that acquires the spectral characteristics of external light or illumination light may be further provided, and the spectral characteristics $\{F_B, F_G, F_R\}$ may be acquired together with the spectral characteristics of external light or illumination light.

The coefficient acquisition section 170 reads the spectral characteristics $\{F_B, F_G, F_R\}$ from the spectral characteristic storage section 195, and calculates the coefficients $\alpha$ and $\beta$ as described above based on the spectral characteristics $\{F_B, F_G, F_R\}$.

Alternatively, the coefficients $\alpha$ and $\beta$ calculated in advance from the spectral characteristics $\{F_B, F_G, F_R\}$ may be stored in the spectral characteristic storage section 195. In this case, the coefficient acquisition section 170 acquires the coefficients $\alpha$ and $\beta$ by reading the coefficients $\alpha$ and $\beta$ from the spectral characteristic storage section 195.

The correction processing section 120 calculates the high-color-reproduction image {r', g', b'} based on the coefficients $\alpha$ and $\beta$ by performing a process based on the above method, and outputs the high-color-reproduction image.

The quality enhancement processing section 180 performs an adjustment process (e.g., color balance adjustment process) on the high-color-reproduction image {r', g', b'} in order to improve color reproducibility. Specifically, the quality enhancement processing section 180 performs an appropriate quality enhancement process (e.g., white balance process) on the high-color-reproduction image {r', g', b'}. The quality enhancement processing section 180 outputs the resulting image to the monitor image generation section 150, and the monitor image generation section 150 displays the image on the monitor display section 50.

The imaging mode selection section 190 selects the monitor display image. Specifically, the imaging mode selection section 190 instructs the monitor image generation section 150 to display the high-sensitivity image or the high-color-reproduction image (that has been selected) on the monitor. The imaging mode selection section 190 may instruct the monitor image generation section 150 to display both the high-sensitivity image and the high-color-reproduction image on the monitor. The image may be selected based on an instruction that has been input by the user through an operation section (not illustrated in the drawings), for example. Alternatively, an external light sensor may be provided, and the image may be selected based on the brightness detected by the external light sensor. For example, the high-color-reproduction image may be selected when the brightness of external light is higher than a threshold value, and the high-sensitivity image may be selected when the brightness of external light is lower than the threshold value.

Although an example in which the image processing device 100 is included in the imaging device has been described above, the image processing device 100 may be provided separately from the imaging device. In this case, the imaging device (that is provided separately from the image processing device 100) records captured image data and data that represents the spectral characteristics $\{F_B, F_G, F_R\}$ in a recording device (not illustrated in the drawings). The image processing device 100 acquires the recorded data, and calculates the high-color-reproduction image {r', g', b'} from the acquired data. Specifically, the image processing device 100 may calculate the high-color-reproduction image by performing a post-capture process. When the image processing device 100 is provided separately from the imaging device, the image processing device 100 may be an information processing device such as a PC, for example.

According to the above imaging system, it is possible to select the high-sensitivity image when it is desired to give priority to sensitivity in a dark environment, and select the high-color-reproduction image when it is desired to give priority to color reproducibility in a bright environment. It is possible to capture two images in real time, and implement a reduction in the amount of data and an imaging process that flexibly deals with the objective as compared with a known method that captures images a plurality of times while changing the conditions. According to the first embodiment, since the process basically depends on the characteristics of the color filters of the image sensor, it is unnecessary to provide an optical filter that extracts high-purity primary-color pixel values, and a mechanism that mechanically inserts and removes an optical filter. Therefore, the imaging system can be easily implemented, and is absolutely feasible.

3. Second Embodiment

A second embodiment of the invention is described below. An imaging device according to the second embodiment may be configured in the same manner as the imaging device illustrated in FIGS. 1 and 6.

In the second embodiment, the spectral characteristics of the regions $\{\phi_R, \phi_{RB}, \phi_B\}$ are estimated based on a relational expression. Specifically, the pixel values $\{I\cdot\phi_R, I\cdot\phi_{RB}, I\cdot\phi_B\} = \{r', gx, b'\}$ that correspond to the regions $\{\phi_R, \phi_{RB}, \phi_B\}$ and the primary-color pixel values {r, g, b} obtained by the demosaicing process satisfy the relationship represented by the following expression (13). Note that the case where $I\cdot\phi_{RB}=gx$ is described below for convenience of explanation.

$$r = I\cdot F_R = I\cdot(\phi_R+\phi_{RB}) = r'+gx,$$

$$b = I\cdot F_B I\cdot(\phi_B+\phi_{RB}) = b'+gx \qquad (13)$$

The relational expression represented by the following expression (14) is obtained (see the expression (13)) provided that $I\cdot\phi_{RB}=gx$ is an unknown (unknown variable).

$$gx = (\text{unknown}),$$

$$r' = r - gx,$$

$$b' = b - gx \qquad (14)$$

The expression (14) represents that the pixel values {r', b'} are uniquely determined when the unknown gx has been determined. When the value gx is correct, the pixel values {r', b'} can be calculated as correct values.

However, there are a number of solutions in this stage with respect to the candidate values {r', gx, b'}. In order to determine the maximum likelihood solution from a number of solutions, reference values $\{I_R, I_{RB}, I_B\}$ that exist in the vicinity of the candidate values {r', gx, b'} are calculated. The occupancy ratio of the region $\phi_R$ with respect to the spectral characteristics $F_R$ is referred to as $\gamma_R$, the occupancy ratio of the region $\phi_B$ with respect to the spectral characteristics $F_B$ is referred to as $\gamma_B$, and the reference values are represented by the following expression (15). Note that a is a coefficient that is calculated as described above in connection with the first embodiment.

$$I_R \cdot I \cdot \phi_R = I \cdot (\gamma_R \cdot F_R) = \gamma_R \cdot r,$$

$$I_{RB} = I \cdot \phi_{RB} = I \cdot (\alpha \cdot F_G) = \alpha \cdot g,$$

$$I_B = I \cdot \phi_B = I \cdot (\gamma_B \cdot F_B) \gamma_B \cdot b \quad (15)$$

In order to determine the maximum likelihood solution with respect to the reference values $\{I_R, I_{RB}, I_B\}$ from the candidate values $\{r', gx, b'\}$, the candidate values $\{r', gx, b'\}$ that minimize an error therebetween is calculated.

Figure 7:
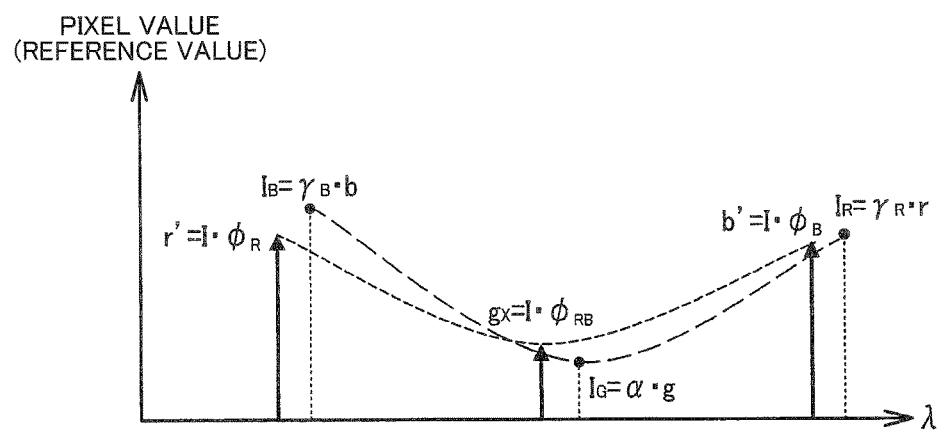
FIG. 7 is a view illustrating a method that calculates a high-color-reproduction image (second embodiment).

The spectral characteristics $\{F_R, F_G, F_B\}$ are determined by the imaging conditions, and the coefficient $\alpha$, the occupancy ratio $\gamma_R$, and the occupancy ratio $\gamma_B$ are known information. Therefore, the spectral characteristics $\{F_R, F_G, F_B\}$, the coefficient $\alpha$, the occupancy ratio $\gamma_R$, and the occupancy ratio $\gamma_B$ are substituted into the expression (15) to calculate the reference values $\{I_R, I_{RB}, I_B\}$. The reference values and the expression (14) are substituted into the following expression (16) (evaluation function E(gx)) to calculate the unknown gx that minimizes the evaluation function E(gx). Specifically, the unknown gx that minimizes an error between the candidate values $\{r', gx, b'\}$ (calculated using the unknown gx) and the reference values $\{I_R, I_{RB}, I_B\}$ is determined (see FIG. 7).

$$E(gx) = (r' - I_R)^2 + (gx - I_{RB})^2 + (b' - I_B)^2 \quad (16)$$

The unknown gx that minimizes the evaluation function E(gx) may be calculated (searched) using the expression (16) while changing the unknown gx, or the expression (16) may be expanded as a quadratic function of the unknown gx, and analytically solved to determine the unknown gx.

Note that the ranges of the candidate values $\{r', gx, b'\}$ are limited as represented by the following expression (17). Therefore, the unknown gx is determined so that the conditions represented by the following expression (17) are satisfied.

$0 \leq r' <$ (maximum preset pixel value)

$0 \leq gx <$ (maximum preset pixel value)

$0 \leq b' <$ (maximum preset pixel value) (17)

4. Third Embodiment 4.1. Method that Reduces Leakage Light Between Right-Pupil Image and Left-Pupil Image A third embodiment of the invention is described below. In the third embodiment, a phase difference detection process is performed using the right pupil and the left pupil to reduce leakage light between the right-pupil image and the left-pupil image.

Although an example that divides the pupil of a monocular optics is described below, the configuration is not limited thereto. For example, a twin-lens optics may be used to provide two pupils. Although an example in which the first pupil is the right pupil and the second pupil is the left pupil is described below, the configuration is not limited thereto. Specifically, the pupil need not necessarily be divided into the right pupil and the left pupil. It suffices that the pupil be divided into the first pupil and the second pupil along an arbitrary direction that is perpendicular to the optical axis of the imaging optics.

FIG. 8 illustrates a basic configuration example of an imaging device according to the third embodiment. The imaging device includes an optics 10 that forms an image of the object on an image sensor. The optics 10 includes an imaging lens 14 and an optical filter 12.

The optical filter 12 includes a right-pupil filter FL1 (first filter) that has transmittance characteristics $f^R$, and a left-pupil filter FL2 (second filter) that has transmittance characteristics $f^L$. The optical filter 12 is provided at the pupil position (e.g., a position where the aperture is provided) of the imaging optics 10. The filter FL1 corresponds to the right pupil, and the filter FL2 corresponds to the left pupil. When the light intensity of light incident on the image sensor is referred to as I, $I^R(x) = I(x) \cdot f^R$, $I^L(x) = I(x) \cdot f^L$, and $I(x) = I^R(x) + I^L(x)$. Note that x is the position (coordinates) in the horizontal direction (pupil division direction).

The transmittance characteristics $\{f^R, f^L\}$ are obtained by dividing the imaging wavelength band into two spectral (band) components. As illustrated in FIG. 9, the transmittance characteristics $\{f^R, f^L\}$ are obtained by dividing the band that includes (covers) RGB spectral characteristics $\{F_R, F_G, F_B\}$ into two spectral (band) components. For example, the band is divided at the wavelength $\lambda_C$ at which the spectral characteristics $F_R$ and the spectral characteristics $F_B$ cross each other. Alternatively, the band is divided at a wavelength that is set so as to increase the degree of separation between the right-pupil image and the left-pupil image.

The image captured by the image sensor is obtained as the component values obtained by multiplying the incident light intensity I by the RGB spectral characteristics $\{F_R, F_G, F_B\}$ (see FIG. 9). The spectral characteristics $\{F_R, F_G, F_B\}$ are composite spectral characteristics of the spectral characteristics of the color filter provided at each pixel of the image sensor, and the spectral characteristics of external light or illumination light applied to the object.

The spectral characteristics $\{F_R, F_G, F_B\}$ are divided into four regions. The overlapping region of the spectral characteristics $F_R$ and the transmittance characteristics $f^R$ is referred to as $\phi_{GR}$, and the overlapping region of the spectral characteristics $F_B$ and the transmittance characteristics $f^L$ is referred to as $\phi_{GB}$. A region obtained by subtracting the overlapping component $\phi_{RB}$ ($= \phi_{GR} + \phi_{GB}$) from the spectral characteristics $F_R$ is referred to as $\phi_R$, and a region obtained by subtracting the overlapping component $\phi_{RB}$ ($= \phi_{GR} + \phi_{GB}$) from the spectral characteristics $F_B$ is referred to as $\phi_B$.

It is necessary to accurately separate the right-pupil image and the left-pupil image in order to accurately detect phase difference information. Since separate bands $\{f^R, f^L\}$ are assigned to the right pupil and the left pupil, it is possible to separate the right-pupil image and the left-pupil image when the right-pupil image is formed by the pixel value $r = I \cdot F_R$, and the left-pupil image is formed by the pixel value $b = I \cdot F_B$, for example.

However, since the filter characteristics of the image sensor are not completely separated into the bands $\{f^R, f^L\}$ assigned to the right pupil and the left pupil, the pupil image component is mixed as leakage light, and acquired. Specifically, the pixel value $r = I \cdot F_R$ of the right-pupil image includes the component $\phi_{GB}$ that overlaps the spectral characteristics $f^L$ of the left pupil, and the pixel value $b = I \cdot F_B$ of the left-pupil image includes the component $\phi_{GR}$ that overlaps the spectral characteristics $f^R$ of the right pupil. The right-pupil image and the left-pupil image are mixed in this manner, and the degree of separation decreases.

Figure 10:
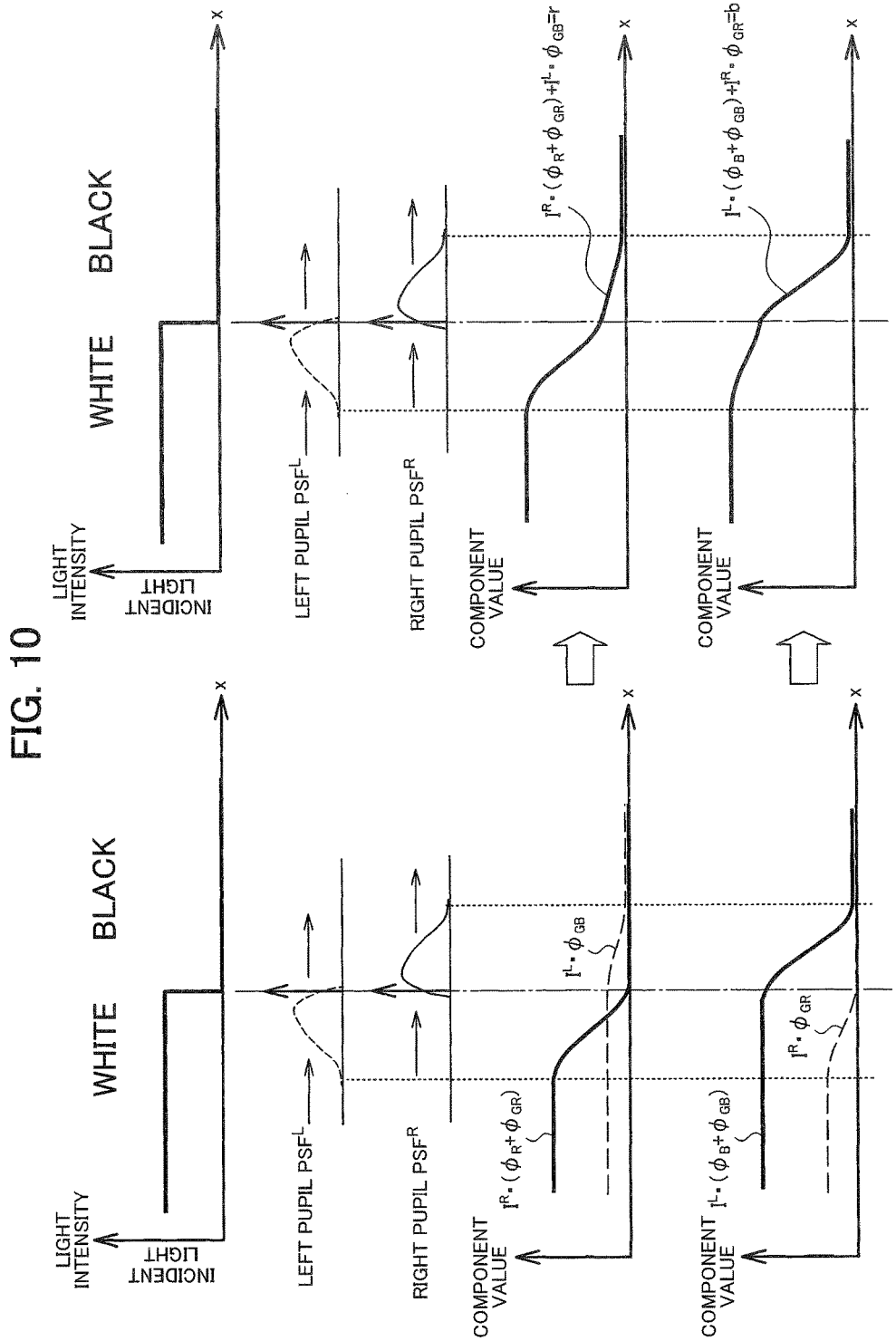
FIG. 10 is a view illustrating the profile of a right-pupil image and the profile of a left-pupil image.

The phase difference detection accuracy deteriorates due to a decrease in the degree of separation. For example, when the image pattern is a pattern in which the color of the object changes from white to black (see FIG. 10), the profile of the right-pupil image and the profile of the left-pupil image are distorted, and the similarity between the right-pupil image and the left-pupil image is lost. As a result, the accuracy of the phase difference detection process that utilizes correlation calculations significantly deteriorates.

Specifically, the component that has passed through the right pupil and the component that has passed through the left pupil are a convolution of a point spread function $PSF^L$ or $PSF^R$ and the profile of the object. Therefore, the component that has passed through the right pupil and the component that has passed through the left pupil produce parallax (phase difference). Since the pixel value r of the right-pupil image includes the component $I^R \cdot (\gamma_R + \phi_{GR})$ that has passed through the right pupil and the component $I^L \cdot \phi_{GB}$ that has passed through the left pupil, the profile of the pixel value r obtained by adding up the components that produce parallax is not a profile that corresponds to only the right pupil, and is distorted. Since the pixel value b includes the component $I^L \cdot (\phi_B + \phi_{GB})$ that has passed through the left pupil and the component $I^R \cdot \phi_{GR}$ that has passed through the right pupil, the profile of the pixel value b is distorted. When correlation calculations are performed on these profiles, it is impossible to implement accurate matching since the similarity has decreased due to distortion.

According to the third embodiment, the component $I^L \cdot \phi_{GB}$ (unnecessary component) that has passed through the left pupil is removed from the right-pupil image, and the component $I^R \cdot \phi_{GR}$ (unnecessary component) that has passed through the right pupil is removed from the left-pupil image. Since $\phi_{RB} = \phi_{GR} + \phi_{GB}$, the pixel values $\{r', b'\} = \{I^R \cdot \gamma_R, I^L \cdot \phi_B\}$ that correspond to the spectral characteristics $\{\gamma_R, \phi_B\}$ can be calculated by reducing or removing the component value that corresponds to the region $\phi_{RB}$ using the method described above in connection with the first embodiment and the like. Since the pixel values $\{r', b'\}$ are considered to be a pure component (light) that has passed through the right pupil and a pure component (light) that has passed through the left pupil, it is possible to obtain an undistorted profile. When the right-pupil image and the left-pupil image are respectively formed by the pixel values $\{r', b'\}$, it is possible to maintain the similarity between the right-pupil image and the left-pupil image, and implement a highly accurate phase difference detection process.

4.2. Imaging Device

Figure 11:
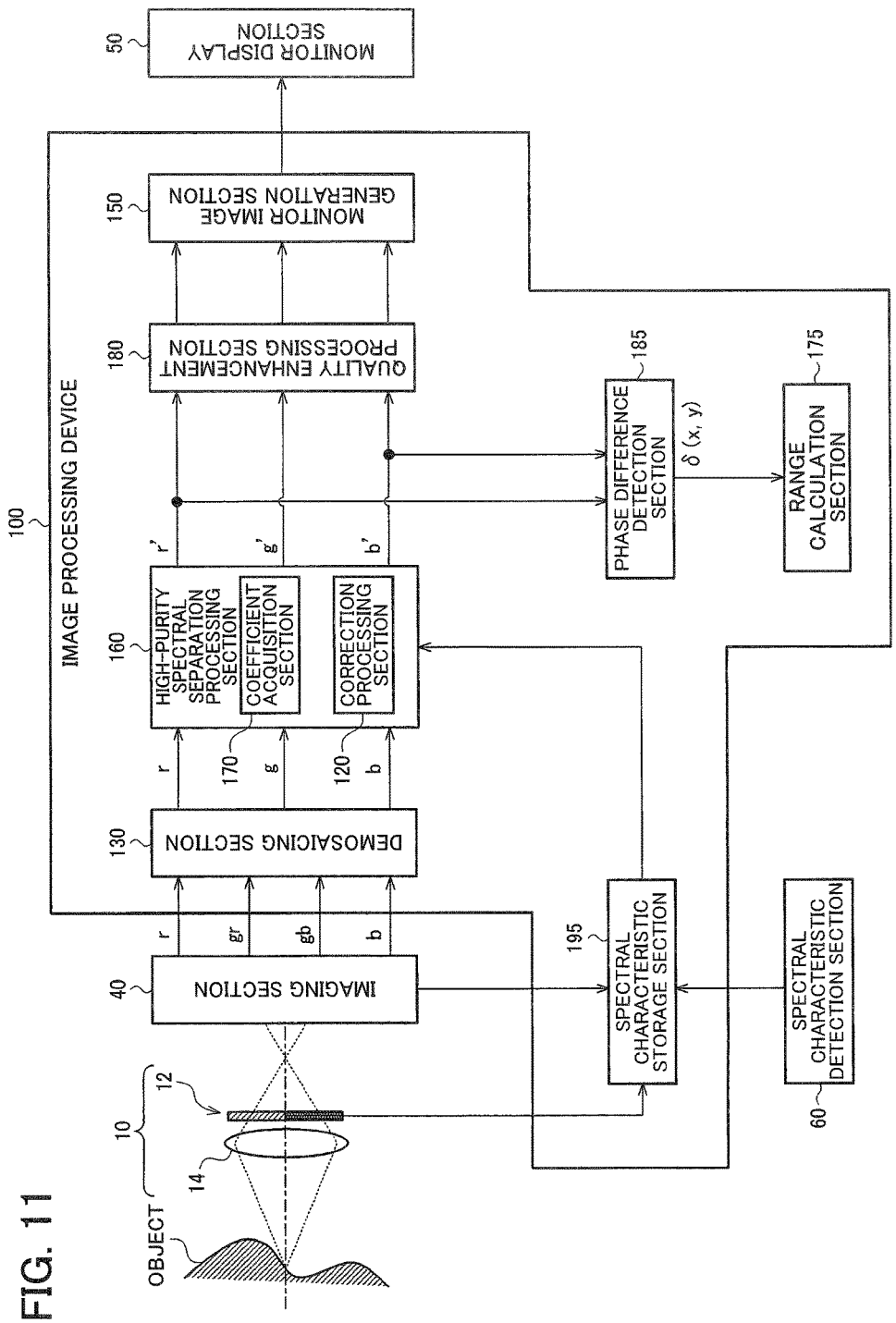
FIG. 11 illustrates a configuration example of an imaging device (third embodiment).

FIG. 11 illustrates a configuration example of the imaging device according to the third embodiment. The imaging device includes the optics 10 (optical filter 12 and imaging lens 14), an imaging section 40, a monitor display section 50, a spectral characteristic detection section 60, and an image processing device 100. The image processing device 100 includes a demosaicing section 130, a monitor image generation section 150, a high-purity spectral separation processing section 160, a range calculation section 175, a quality enhancement processing section 180, a phase difference detection section 185, and a spectral characteristic storage section 195. Note that the same elements as those described above with reference to FIGS. 1 and 6 are indicated by the same reference signs (symbols), and description thereof is appropriately omitted.

The spectral characteristic storage section 195 stores the spectral characteristics $\{F_B, F_G, F_R\}$ determined by the spectral characteristics of the optical filter 12, the spectral characteristics of illumination light (or external light), and the spectral characteristics of the color filters of the image sensor. Alternatively, the spectral characteristic storage section 195 may store the coefficients α and β calculated in advance from the spectral characteristics $\{F_B, F_G, F_R\}$.

The phase difference detection section 185 detects the phase difference δ(x, y) between the high-color-purity right-pupil image and the high-color-purity left-pupil image $\{r', b'\}$ output from the high-purity spectral separation processing section 160. The phase difference δ(x, y) is calculated on a pixel basis. Note that (x, y) represents the position (coordinates) within the image. For example, x corresponds to the horizontal scan direction, and y corresponds to the vertical scan direction.

The range calculation section 175 performs a three-dimensional measurement process based on the detected phase difference δ(x, y). Specifically, the range calculation section 175 calculates the distance to the object at each pixel position (x, y) from the phase difference δ(x, y) to acquire three-dimensional shape information about the object. The details of the ranging method are described later.

Examples of the application of the third embodiment include a high-speed phase detection AF process that utilizes the phase difference δ(x, y), a three-dimensional measurement process that utilizes ranging information, a three-dimensional display process, and the like.

Although an example in which the high-purity spectral separation processing section 160 calculates the high-color-reproduction pixel values $\{r', g', b'\}$ has been described above, the configuration is not limited thereto. For example, the high-purity spectral separation processing section 160 may calculate only the high-color-reproduction pixel values $\{r', b'\}$.

4.3. Simulation Example

Figure 12:
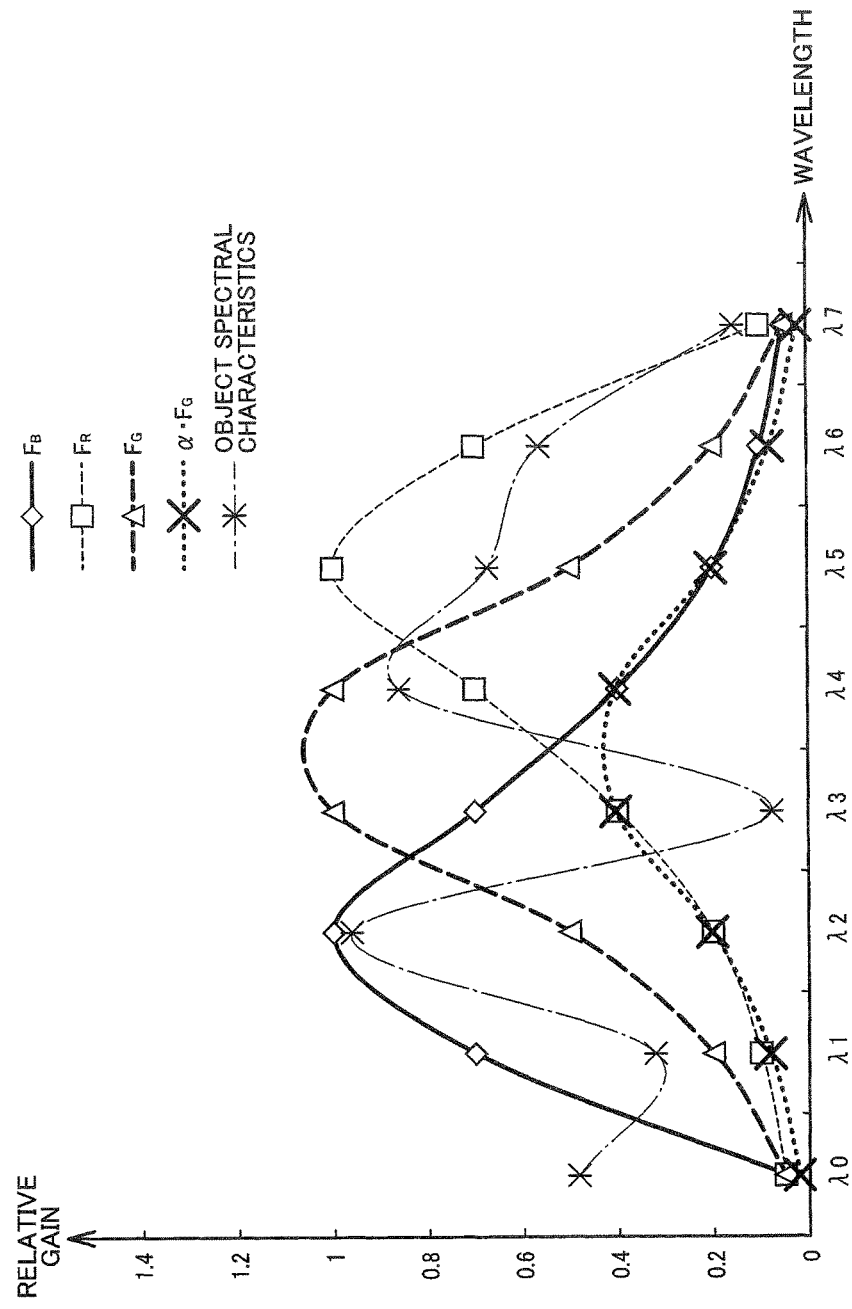
FIG. 12 illustrates an example of simulation results.
Figure 13:
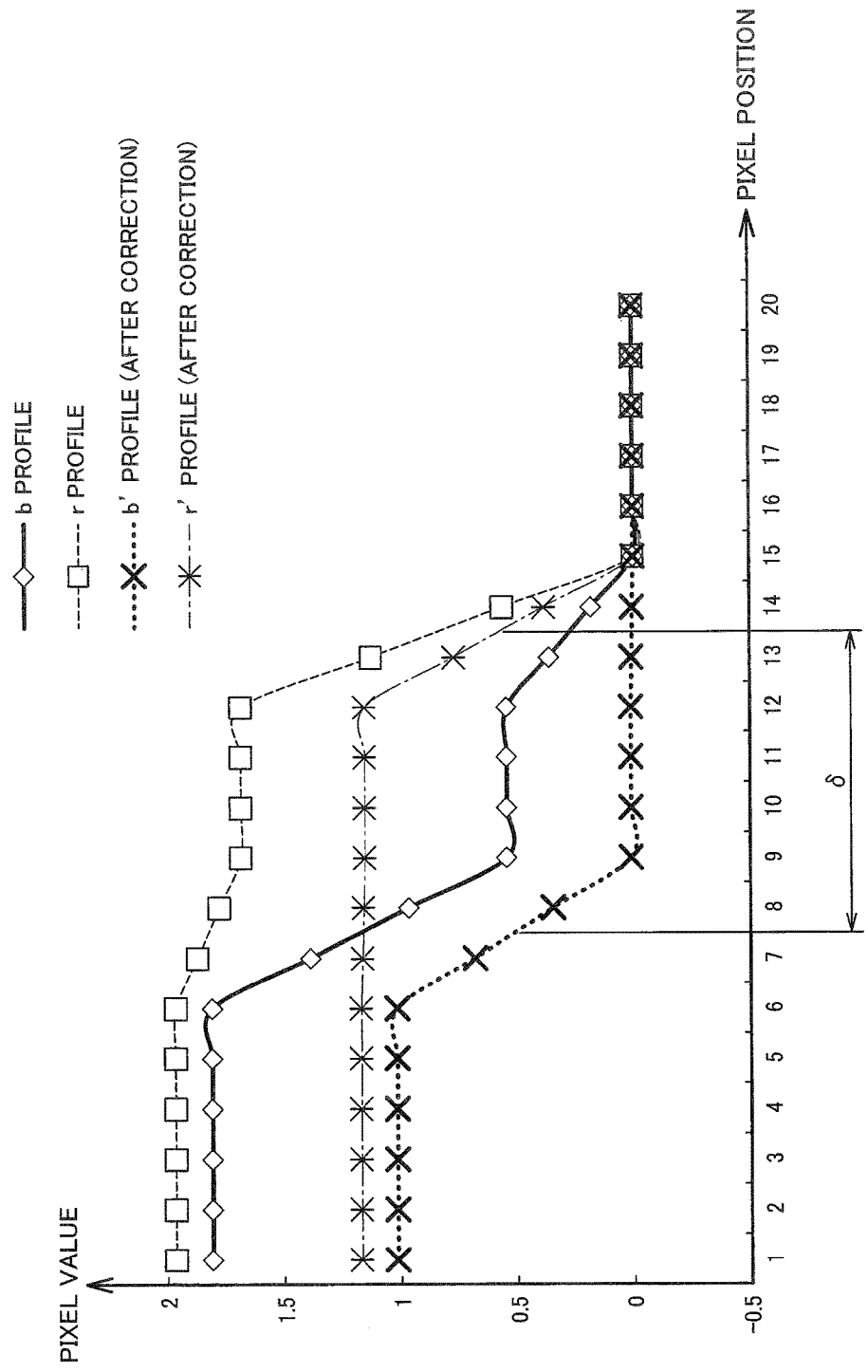
FIG. 13 illustrates an example of simulation results.

FIGS. 12 and 13 illustrate an example of the simulation results when the first embodiment was applied to the third embodiment.

FIG. 12 illustrates the RGB spectral characteristics $F_B$, $F_G$, and $F_R$ that were set during the simulation, and the spectral characteristics of the object. Note that the spectral characteristics of the object can be set arbitrarily. The spectral characteristics of the object are not limited to the characteristics illustrated in FIG. 12. FIG. 12 also illustrates the spectral characteristics $F_{G1} = \alpha \cdot F_G$ described above in connection with the first embodiment. The overlapping region $\phi_{RB}$ of the spectral characteristics $F_B$ and $F_R$ is approximated using the coefficient α and the spectral characteristics $F_G$.

FIG. 13 illustrates the simulation results for the edge of the object (e.g., the edge illustrated in FIG. 10) based on the spectral characteristics illustrated in FIG. 12. The r profile and the b profile represent the profile of the right-pupil image and the profile of the left-pupil image before correction. The r' profile and the b' profile represent the profile of the right-pupil image and the profile of the left-pupil after correction. It is desirable that the profile of the right-pupil image and the profile of the left-pupil be similar profiles that are shifted by the phase difference δ in the pupil division direction (horizontal axis direction). The profiles before correction represent that the right-pupil image and the left-pupil after were mixed, and the similarity between the right-pupil image and the left-pupil image was lost. On the other hand, the profiles after correction represent that the profile of the right-pupil image and the profile of the left-pupil were similar and shifted by the phase difference δ in the pupil division direction. It is obvious that the phase difference detection accuracy is improved by performing correlation calculations on such similar profiles.

According to the above embodiments, the second color (green) is a color that is longer in wavelength than the first color (blue) and is shorter in wavelength than the third color (red) (see FIG. 9). The first wavelength band $f^R$ that passes through the first pupil (first filter FL1, right pupil) corresponds to the third color (red), and the second wavelength band $f^L$ that passes through the second pupil (second filter FL2, left pupil) corresponds to the first color (blue).

According to this configuration, it is possible to detect the phase difference by utilizing the image that corresponds to the third color (red) as the first-pupil image (right-pupil image), and utilizing the image that corresponds to the first color (blue) as the second-pupil image (left-pupil image). Since the pixel value that corresponds to the first color and the pixel value that corresponds to the third color are corrected based on the component value that corresponds to the overlapping region $\phi_{RB}$ of the first transmittance characteristics $F_B$ and the third transmittance characteristics $F_R$, it is possible to suppress a situation in which the right-pupil image and the left-pupil image are mixed (leakage light), and implement a highly accurate phase difference detection process.

Note that the first wavelength band that corresponds to the third color includes at least the third-color band included in the white band (i.e., a band that covers the spectral characteristics $F_R$, $F_G$, and $F_B$), and need not necessarily include the entire band of the third-color transmittance characteristics $F_R$. For example, it suffices that the first wavelength band correspond to the main band (e.g., a band around the maximum transmittance) of the third-color transmittance characteristics $F_R$. For example, the first wavelength band may be a long-wavelength-side (i.e., red-side) band when the white band is divided at the wavelength $\lambda_C$ (see FIG. 9). This also applies to the second wavelength band that corresponds to the first color. Specifically, the second wavelength band includes at least the first-color band included in the white band, and need not necessarily include the entire band of the first-color transmittance characteristics $F_B$.

According to the above embodiments, the correction processing section 120 estimates the component value $I \cdot \phi_{RB} \approx \alpha \cdot g$ that corresponds to the overlapping region of the first transmittance characteristics $F_B$ and the third transmittance characteristics $F_R$ based on the pixel value g that corresponds to the second color, and reduces the component value $I \cdot \phi_{RB} \approx \alpha \cdot g$ that corresponds to the overlapping region from the pixel value b that corresponds to the first color and the pixel value g that corresponds to the third color.

This makes it possible to implement a correction process that reduces or cancels the overlapping component ($I \cdot \phi_{RB}$) of the pixel value b that corresponds to the first color and the pixel value r that corresponds to the third color. Therefore, it is possible to obtain an image having high color purity (that is obtained using color filters for which the transmittance characteristics overlap each other to only a small extent) from the high-sensitivity captured image captured using the color filters for which the transmittance characteristics $F_B$, $F_G$, and $F_R$ overlap each other. It is possible to improve the phase difference detection accuracy by performing correlation calculations using the image having high color purity.

According to the above embodiments, the correction processing section 120 multiplies the pixel value g that corresponds to the second color by the first coefficient $\alpha$ based on the first transmittance characteristics $F_B$ and the third transmittance characteristics $F_R$ to calculate the component value $I \cdot \phi_{RB} \approx \alpha \cdot g$ that corresponds to the overlapping region (see FIG. 2 and the expressions (1) to (5)).

A normal image sensor is designed so that the overlapping region $\phi_{RB}$ of the spectral characteristics $F_B$ of the color filter that corresponds to the first color (blue) and the spectral characteristics $F_R$ of the color filter that corresponds to the third color (red) is similar to the spectral characteristics $F_G$ of the color filter that corresponds to the second color (green) (see above). According to the above embodiments, since it is possible to separate the high-color-purity image, spectral characteristics differing from those of a normal image sensor may also be employed. In this case, the similarity between the overlapping region $\phi_{RB}$ and the spectral characteristics $F_G$ may be increased. It is possible to estimate the component value $I \cdot \phi_{RB}$ that corresponds to the overlapping region to be $\alpha \cdot g$ based on the similarity between the overlapping region $\phi_{RB}$ and the spectral characteristics $F_G$, and perform the correction process that increases the color purity of the pixel value b that corresponds to the first color, the pixel value g that corresponds to the second color, and the pixel value r that corresponds to the third color based on the estimated value.

According to the above embodiments, the coefficient acquisition section 170 acquires the first coefficient $\alpha$ that maximizes the similarity between the second transmittance characteristics $F_G$ multiplied by the first coefficient $\alpha$ and the overlapping region $\phi_{RB}$ (see FIG. 4 and the expressions (9) and (10)).

This makes it possible to determine the coefficient $\alpha$ that maximizes the similarity between the second transmittance characteristics $F_G$ and the overlapping region $\phi_{RB}$ based on the similarity between the second transmittance characteristics $F_G$ and the overlapping region $\phi_{RB}$. Therefore, it is possible to improve the accuracy of the correction process that increases the color purity (i.e., the correction process that subtracts the component $\alpha \cdot g$ that corresponds to the overlapping region from the pixel values r and b).

According to the above embodiments, the first coefficient $\alpha$ that maximizes the similarity is the first coefficient $\alpha$ that minimizes the Euclidean distance between the vector $V_{RB}$ and the vector $V_G$, the vector $V_{RB}$ corresponding to the overlapping region $\phi_{RB}$, and including the transmittance components that respectively correspond to a plurality of wavelengths ($\lambda_0, \lambda_1, \ldots, $ and $\lambda_N$), and the vector $V_G$ corresponding to the second transmittance characteristics $F_G$ multiplied by the first coefficient $\alpha$, and including the transmittance components that respectively correspond to a plurality of wavelengths ($\lambda_0, \lambda_1, \ldots, $ and $\lambda_N$) (see FIG. 4 and the expressions (9) and (10)).

This makes it possible to calculate the similarity using the Euclidean distance between the vector $V_{RB}$ and the vector $V_G$ as an index. The first coefficient $\alpha$ is determined on the assumption that the similarity becomes a maximum when the index becomes a minimum.

According to the above embodiments, the correction processing section 120 corrects the pixel value b that corresponds to the first color by subtracting the component value $\alpha \cdot g$ that corresponds to the overlapping region $\phi_{RB}$ from the pixel value b that corresponds to the first color (pixel value b'), and corrects the pixel value r that corresponds to the third color by subtracting the component value $\alpha \cdot g$ that corresponds to the overlapping region $\phi_{RB}$ from the pixel value r that corresponds to the third color (pixel value r') (see the expressions (1) to (5)).

This makes it possible to reduce the component value $I \cdot \phi_{RB}$ that corresponds to the overlapping region $\phi_{RB}$ from the pixel value b that corresponds to the first color and the pixel value r that corresponds to the third color using the component value $\alpha \cdot g$ that corresponds to the overlapping region $\phi_{RB}$ estimated using the first coefficient. Therefore, it is possible to calculate the pixel values b and r having high color purity from the captured image for which the spectral characteristics of the color filters overlap each other.

According to the above embodiments, the correction processing section 120 corrects the pixel value g that corresponds to the second color by subtracting the component value α·g that corresponds to the overlapping region, the corrected pixel value b' that corresponds to the first color, and the corrected pixel value r' that corresponds to the third color from the pixel value g that corresponds to the second color that is multiplied by the second coefficient β based on the first transmittance characteristics $F_B$ and the third transmittance characteristics $F_R$ (pixel value g') (see FIG. 5 and the expressions (6) and (7)).

This makes it possible to estimate the component value β·g of the spectral characteristics obtained by increasing the gain of the second transmittance characteristics $F_G$ using the second coefficient β, and calculate the pixel value g' that corresponds to the second color and has high color purity based on the estimated component value β·g. Specifically, it is possible to perform the correction process that reduces the overlapping component of the pixel value b that corresponds to the first color and the pixel value r that corresponds to the second color from the component value β·g.

According to the above embodiments, the coefficient acquisition section 170 acquires the second coefficient β that maximizes the similarity of a short-wavelength-side part (i.e., a part that corresponds to a wavelength shorter than the wavelength $\lambda_B$) of the first transmittance characteristics $F_B$ and a long-wavelength-side part (i.e., a part that corresponds to a wavelength shorter than the wavelength $\lambda_R$) of the third transmittance characteristics $F_R$, with the second transmittance characteristics $F_G$ multiplied by the second coefficient β (see FIG. 5) (see the expressions (11) and (12)).

This makes it possible to determine the coefficient β that maximizes the similarity of the second transmittance characteristics $F_G$ with part of the first transmittance characteristics $F_B$ and part of the third transmittance characteristics $F_R$ based on the similarity of the second transmittance characteristics $F_G$ with part of the first transmittance characteristics $F_B$ and part of the third transmittance characteristics $F_R$. Therefore, it is possible to improve the accuracy of the correction process that increases the color purity (i.e., the correction process that subtracts the components r', b', and α·g that correspond to the overlapping region from the component value β·g).

According to the above embodiments, a given wavelength that is shorter than the wavelength that corresponds to the maximum transmittance represented by the first transmittance characteristics $F_B$ is referred to as a first wavelength $\lambda_B$, and a given wavelength that is longer than the wavelength that corresponds to the maximum transmittance represented by the third transmittance characteristics $F_R$ is referred to as a second wavelength $\lambda_R$ (see FIG. 5). A vector that corresponds to the first transmittance characteristics $F_B$, and includes the transmittance components that respectively correspond to a plurality of wavelengths ($\lambda_0$, $\lambda_1$, . . . , and $\lambda_N$) shorter than the first wavelength $\lambda_B$ is referred to as $V_B$. A vector that corresponds to the third transmittance characteristics $F_R$, and includes the transmittance components that respectively correspond to a plurality of wavelengths ($\lambda_R$, $\lambda_{R+1}$, . . . , and $\lambda_N$) longer than the second wavelength $\lambda_R$ is referred to as $V_R$. Vectors that correspond to the second transmittance characteristics $F_G$ multiplied by the second coefficient β, and include the transmittance components that respectively correspond to a plurality of wavelengths are referred to as $V_{GB2}$ and $V_{GR2}$ (see the expression (11)). In this case, the second coefficient β that maximizes the similarity is the second coefficient β that minimizes the Euclidean distance between the vector $V_B$ and the vector $V_{GB2}$ and the Euclidean distance between the vector $V_R$ and the vector $V_{GR2}$ (see the expression (12)).

This makes it possible to calculate the similarity using the Euclidean distance between the vector $V_B$ and the vector $V_{GB2}$ and the Euclidean distance between the vector $V_R$ and the vector $V_{GR2}$ as indices. The second coefficient β is determined on the assumption that the similarity becomes a maximum when the indices become a minimum.

According to the above embodiments, the correction processing section 120 calculates the evaluation value E(gx) that represents the similarity of the candidate value for the component value gx=I·$\phi_{RB}$ that corresponds to the overlapping region $\phi_{RB}$, the value b'=b−gx obtained by correcting the pixel value b that corresponds to the first color (blue) using the candidate value gx, and the value r'=r−gx obtained by correcting the pixel value r that corresponds to the third color (red) using the candidate value gx, with the pixel value b that corresponds to the first color, the pixel value g that corresponds to the second color, and the pixel value r that corresponds to the third color (see the expressions (13) to (16)). The correction processing section 120 calculates the component value gx=I·$\phi_{RB}$ that corresponds to the overlapping region $\phi_{RB}$ by determining the candidate value gx that maximizes the similarity based on the evaluation value E(gx) (see FIG. 7).

This makes it possible to calculate the corrected pixel values {r', g', b'} based on the similarity of the candidate values {r', gx, b'} for the corrected pixel values with the pixel value b that corresponds to the first color, the pixel value g that corresponds to the second color, and the pixel value r that corresponds to the third color. Specifically, the evaluation value E(gx) is calculated as a similarity index, and the component value gx that corresponds to the overlapping region $\phi_{RB}$ is determined on the assumption that the similarity becomes a maximum when the evaluation value E(gx) becomes a minimum, for example. When the component value gx that corresponds to the overlapping region $\phi_{RB}$ has been determined (calculated), the high-color-purity pixel values {r', g', b'} can be calculated in the same manner as described above in connection with the first embodiment.

5. Method that Calculates Distance from Phase Difference

A method that calculates the distance to the object from the phase difference is described below. This ranging method is used for the process performed by the range calculation section 175, for example. A phase detection AF control process may be performed using the defocus amount calculated as described below.

Figure 14:
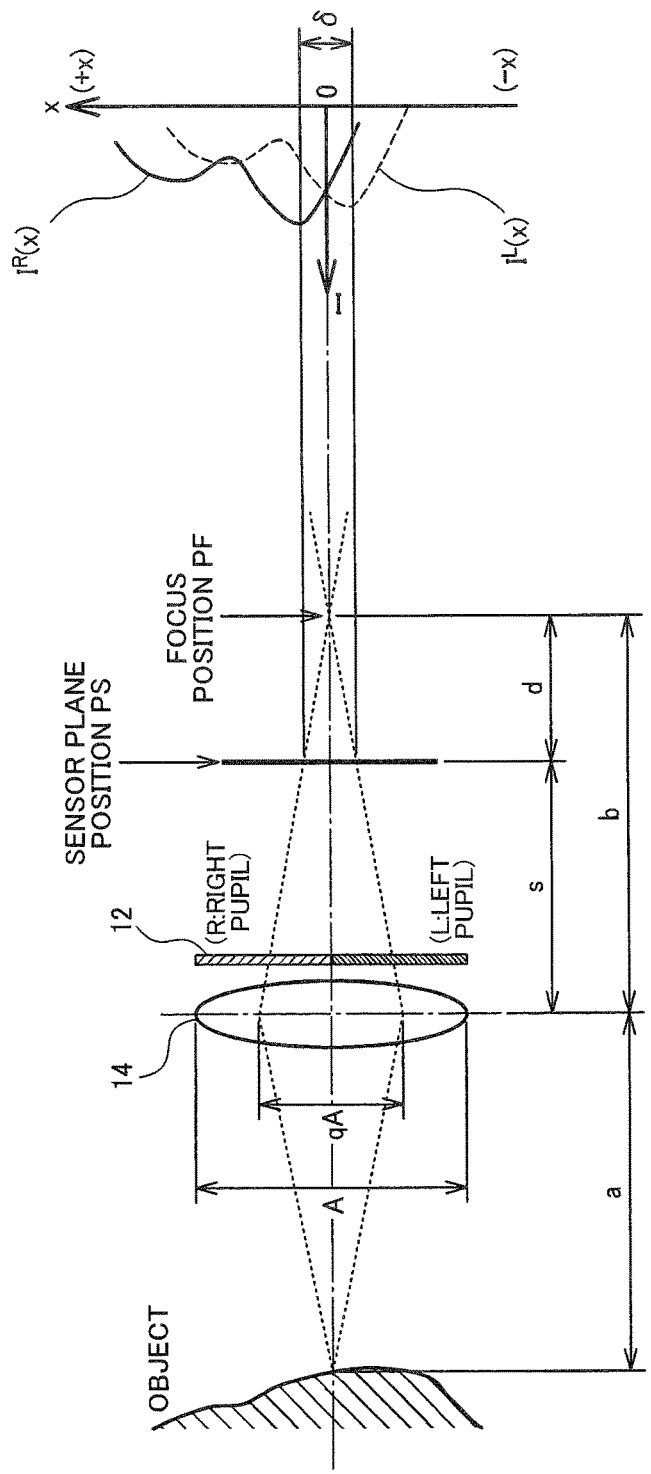
FIG. 14 is a view illustrating a ranging method.

As illustrated in FIG. 14, the maximum aperture diameter is referred to as A, the distance between the center of gravity of the right pupil and the center of gravity of the left pupil with respect to the aperture diameter A is referred to as q×A, the distance from the center of the imaging lens 14 to a sensor plane PS of the image sensor along the optical axis is referred to as s, and the phase difference between the right-pupil image $I^R(x)$ and the left-pupil image $I^L(x)$ in the sensor plane PS is referred to as δ. In this case, the following expression (18) is satisfied through triangulation.

$$q \times A : \delta = b : d ,$$

$$b = s + d \qquad (18)$$

Note that q is a coefficient that satisfies 0≤q≤1, and q×A also changes depending on the aperture. s is a value detected by a lens position detection sensor. b is the distance from the center of the imaging lens 14 to a focus position PF along the optical axis. The phase difference δ is calculated by correlation calculations. The defocus amount d is calculated by the following expression (19) in view of the expression (18).

$$d=(\delta \times s)/\{(q \times A)-\delta\} \quad (19)$$

The distance a is a distance that corresponds to the focus position PF (i.e., the distance from the imaging lens 14 to the object along the optical axis). When the composite focal length of an imaging optics that is formed by a plurality of lenses is referred to as f, the following expression (20) is normally satisfied.

$$(1/a)+(1/b)=1/f \quad (20)$$

The distance b is calculated by the expression (18) using the defocus amount d calculated by the expression (19) and the value s that is detected by a lens position detection sensor, and the distance b and the composite focal length f determined by the imaging optical configuration are substituted into the expression (20) to calculate the distance a. Since the distance a that corresponds to an arbitrary pixel position can be calculated, it is possible to measure the distance to the object, and measure the three-dimensional shape of the object.

The phase detection AF process is performed as described below. For example, when FIG. 14 is a top view illustrating the imaging device (in the direction perpendicular to the pupil division direction), x is the coordinate axis in the horizontal direction (pupil division direction). The phase difference δ along the coordinate axis x is defined to be a positive value or a negative value with respect to the right-pupil image $I^R(x)$ or the left-pupil image $I^L(x)$, and whether the sensor plane PS is situated forward or backward with respect to the focus position PF is determined based on whether the phase difference δ is a positive value or a negative value. When positional relationship between the sensor plane PS and the focus position PF has been determined, it is possible to easily determine the direction in which the focus lens should be moved in order to cause the sensor plane PS to coincide with the focus position PF.

After the defocus amount d has been calculated, and whether the phase difference δ is a positive value or a negative value has been determined, the focus lens is driven so that the defocus amount d becomes 0. Since the color is divided in the horizontal direction using the right pupil and the left pupil, the focusing target area in the horizontal direction is selected from the captured image, and correlation calculations are performed. Since the color division direction is not necessarily the horizontal direction, the correlation calculation direction may be appropriately set taking account of the setting conditions (division direction) for the right-left band separation optical filter. The target area for which the defocus amount d need not necessarily be calculated corresponding to part of the captured image, but may be calculated corresponding to the entire captured image. In this case, a plurality of defocus amounts d are calculated. Therefore, it is necessary to perform a process that determines the final defocus amount using a given evaluation function.

The embodiments to which the invention is applied and the modifications thereof have been described above. Note that the invention is not limited to the above embodiments and the modifications thereof. Various modifications and variations may be made of the above embodiments and the modifications thereof without departing from the scope of the invention. A plurality of elements described in connection with the above embodiments and the modifications thereof may be appropriately combined to implement various configurations. For example, some elements may be omitted from the elements described in connection with the above embodiments and the modifications thereof. Some of the elements described above in connection with different embodiments or modifications thereof may be appropriately combined. The configuration and the operation of the imaging device and the image processing device, and the methods (imaging method and image processing method) for operating the imaging device and the image processing device are not limited to those described in connection with the above embodiments. Various modifications and variations may be made. Specifically, various modifications and applications are possible without materially departing from the novel teachings and advantages of the invention. Any term cited with a different term having a broader meaning or the same meaning at least once in the specification and the drawings can be replaced by the different term in any place in the specification and the drawings.

What is claimed is:

1. An imaging device comprising:
  an optics that includes a first pupil that allows light within a first wavelength band to pass through, and a second pupil that allows light within a second wavelength band to pass through, the second wavelength band differing from the first wavelength band;
  an image sensor that includes a first-color filter that has first transmittance characteristics, a second-color filter that has second transmittance characteristics, and a third-color filter that has third transmittance characteristics, and acquires a pixel value that corresponds to a first color, a pixel value that corresponds to a second color, and a pixel value that corresponds to a third color; and
  a processor comprising hardware,
  the processor being configured to implement:
  a correction process that corrects the pixel value that corresponds to the first color and the pixel value that corresponds to the third color based on a component value that corresponds to an overlapping region of the first transmittance characteristics and the third transmittance characteristics; and
  a phase difference detection process that detects a phase difference between an image formed by the corrected pixel value that corresponds to the first color and an image formed by the corrected pixel value that corresponds to the third color.

2. The imaging device as defined in claim 1,
  the second color being a color that is longer in wavelength than the first color and is shorter in wavelength than the third color, and
  the first wavelength band that passes through the first pupil corresponding to the third color, and the second wavelength band that passes through the second pupil corresponding to the first color.

3. The imaging device as defined in claim 2,
  the processor being configured to implement the correction process that estimates the component value that corresponds to the overlapping region of the first transmittance characteristics and the third transmittance characteristics based on the pixel value that corresponds to the second color, and reduces the component value that corresponds to the overlapping region from the pixel value that corresponds to the first color and the pixel value that corresponds to the third color.

4. The imaging device as defined in claim 3, the processor being configured to implement the correction process that multiplies the pixel value that corresponds to the second color by a first coefficient based on the first transmittance characteristics and the third transmittance characteristics to calculate the component value that corresponds to the overlapping region.

5. The imaging device as defined in claim 4, the processor being configured to implement a coefficient acquisition process that acquires the first coefficient that maximizes similarity between the second transmittance characteristics multiplied by the first coefficient and the overlapping region.

6. The imaging device as defined in claim 5, the first coefficient that maximizes the similarity being the first coefficient that minimizes a Euclidean distance between a vector that corresponds to the overlapping region and includes transmittance components that respectively correspond to a plurality of wavelengths, and a vector that corresponds to the second transmittance characteristics multiplied by the first coefficient and includes transmittance components that respectively correspond to the plurality of wavelengths.

7. The imaging device as defined in claim 3, the processor being configured to implement the correction process that corrects the pixel value that corresponds to the first color by subtracting the component value that corresponds to the overlapping region from the pixel value that corresponds to the first color, and corrects the pixel value that corresponds to the third color by subtracting the component value that corresponds to the overlapping region from the pixel value that corresponds to the third color.

8. The imaging device as defined in claim 7, the processor being configured to implement the correction process that corrects the pixel value that corresponds to the second color by subtracting the component value that corresponds to the overlapping region, the corrected pixel value that corresponds to the first color, and the corrected pixel value that corresponds to the third color, from the pixel value that corresponds to the second color that is multiplied by a second coefficient based on the first transmittance characteristics and the third transmittance characteristics.

9. The imaging device as defined in claim 8, the processor being configured to implement a coefficient acquisition process that acquires the second coefficient that maximizes similarity of a short-wavelength-side part of the first transmittance characteristics and a long-wavelength-side part of the third transmittance characteristics, with the second transmittance characteristics multiplied by the second coefficient.

10. The imaging device as defined in claim 9, a given wavelength that is shorter than a wavelength that corresponds to a maximum transmittance represented by the first transmittance characteristics being a first wavelength, and a given wavelength that is longer than a wavelength that corresponds to a maximum transmittance represented by the third transmittance characteristics being a second wavelength, and the second coefficient that maximizes the similarity being the second coefficient that minimizes a Euclidean distance between a vector that corresponds to the first transmittance characteristics and includes transmittance components that respectively correspond to a plurality of wavelengths shorter than the first wavelength, and a vector that corresponds to the second transmittance characteristics multiplied by the second coefficient and includes transmittance components that respectively correspond to the plurality of wavelengths, and a Euclidean distance between a vector that corresponds to the third transmittance characteristics and includes transmittance components that respectively correspond to a plurality of wavelengths longer than the second wavelength, and a vector that corresponds to the second transmittance characteristics multiplied by the second coefficient and includes transmittance components that respectively correspond to the plurality of wavelengths.

11. The imaging device as defined in claim 3, the processor being configured to implement the correction process that calculates an evaluation value that represents similarity of a candidate value for the component value that corresponds to the overlapping region, a value obtained by correcting the pixel value that corresponds to the first color using the candidate value, and a value obtained by correcting the pixel value that corresponds to the third color using the candidate value, with the pixel value that corresponds to the first color, the pixel value that corresponds to the second color, and the pixel value that corresponds to the third color, and calculates the component value that corresponds to the overlapping region by determining the candidate value that maximizes the similarity based on the evaluation value.

12. An imaging method comprising:
forming an image using an optics that includes a first pupil that allows light within a first wavelength band to pass through, and a second pupil that allows light within a second wavelength band to pass through, the second wavelength band differing from the first wavelength band;
capturing the image using an image sensor that includes a first-color filter that has first transmittance characteristics, a second-color filter that has second transmittance characteristics, and a third-color filter that has third transmittance characteristics;
correcting a pixel value that corresponds to a first color and a pixel value that corresponds to a third color among the pixel value that corresponds to the first color, a pixel value that corresponds to a second color, and the pixel value that corresponds to the third color that have been acquired by the capturing based on a component value that corresponds to an overlapping region of the first transmittance characteristics and the third transmittance characteristics; and
detecting a phase difference between an image formed by the corrected pixel value that corresponds to the first color and an image formed by the corrected pixel value that corresponds to the third color.

* * * * *